(12) United States Patent
Siemers et al.

(10) Patent No.: US 6,632,260 B1
(45) Date of Patent: Oct. 14, 2003

(54) ADJUSTABLE CLEAN-AIR FLOW ENVIRONMENT

(75) Inventors: Warren G. Siemers, Fort Collins, CO (US); Gary D. Hamor, Mead, CO (US)

(73) Assignee: Stratotech Corporation, Loveland, CO (US)

( * ) Notice: Subject to any disclaimer, the term of this patent is extended or adjusted under 35 U.S.C. 154(b) by 0 days.

(21) Appl. No.: 10/018,209

(22) PCT Filed: Apr. 28, 2000

(86) PCT No.: PCT/US00/11736
§ 371 (c)(1),
(2), (4) Date: Oct. 26, 2001

(87) PCT Pub. No.: WO00/64562
PCT Pub. Date: Nov. 2, 2000

Related U.S. Application Data

(60) Provisional application No. 60/131,461, filed on Apr. 28, 1999.

(51) Int. Cl.[7] .............................................. B01D 46/00
(52) U.S. Cl. ............................. 55/385.2; 55/DIG. 18; 55/DIG. 29; 55/DIG. 46; 454/49; 454/56; 454/59; 454/184; 454/187; 454/188; 454/189
(58) Field of Search ................. 55/385.2, DIG. 18, 55/DIG. 46, DIG. 29; 454/49, 56, 59, 184, 187, 188, 189

(56) References Cited

U.S. PATENT DOCUMENTS

| | | |
|---|---|---|
| 2,774,522 A | 12/1956 | Cosulich |
| 3,703,801 A | 11/1972 | Deckas |
| 3,721,067 A | 3/1973 | Agnew |
| 3,728,866 A | 4/1973 | Layton |
| 3,750,558 A | 8/1973 | Jokiel et al. |
| 3,776,121 A | 12/1973 | Truhan |
| 3,802,168 A | 4/1974 | Deckas |
| 3,811,250 A | 5/1974 | Fowler, Jr. |
| 3,828,530 A | 8/1974 | Peters |
| 3,838,556 A | 10/1974 | Finger |
| 3,875,927 A | 4/1975 | Trexler |
| 3,880,061 A | 4/1975 | Hensiek et al. |
| 3,895,570 A | 7/1975 | Eagleson, Jr. |
| 3,897,229 A | 7/1975 | Lada |
| 3,936,284 A | 2/1976 | Mason |
| 3,944,405 A | 3/1976 | van Calsteren et al. |
| 4,016,809 A | 4/1977 | Austin |
| 4,023,472 A | 5/1977 | Grunder et al. |
| 4,088,463 A | 5/1978 | Smith |
| 4,098,174 A | 7/1978 | Landy |
| 4,100,847 A | 7/1978 | Norton |

(List continued on next page.)

OTHER PUBLICATIONS

Terra Universal catalog—CD–Rom Version 104.5, Terra Universal, Inc., 1984–1999, 55 total pages.

Mobile Storage Technology, Mini–Environment Airflow and Particulate Analysis, Stratotech Corporation, Jun. 11, 1999, pp 1–17.

(List continued on next page.)

*Primary Examiner*—Duane Smith
*Assistant Examiner*—Minh-Chau T. Pham
(74) *Attorney, Agent, or Firm*—Santangelo Law Offices, P.C.; Luke Santangelo; Craig R. Miles

(57) ABSTRACT

Enclosures having adjustable clean gas flow environments and methods of enclosed pressure differential distribution technology. Specifically, clean gas flow enclosures, which provide for the isolation of materials from airborne microparticulate contamination. An embodiment of the invention utilizes a small footprint, modular, selectable, clean-gas flow environment for handling and isolating materials. The environment can be a clean room class environment by providing filtered gas from a gas flow generator (12) through a gas filter (13) to a filtered gas flow space (20). An embodiment of the invention provides a first plenum (23) and a second plenum (26) so that both a horizontal filtered gas flow and vertical filtered gas flow may be used separately or in combination within the same filtered gas flow space (20).

51 Claims, 16 Drawing Sheets

U.S. PATENT DOCUMENTS

| | | |
|---|---|---|
| 4,134,331 A | 1/1979 | Bender |
| 4,175,934 A | 11/1979 | Lang et al. |
| D258,759 S | 3/1981 | Johnson |
| 4,268,282 A | 5/1981 | MacKenzie |
| 4,304,224 A | 12/1981 | Fortney |
| 4,319,899 A | 3/1982 | Marsh |
| 4,333,745 A | 6/1982 | Zeanwick |
| 4,344,784 A | 8/1982 | Deckas et al. |
| 4,365,541 A | 12/1982 | Marques et al. |
| 4,371,386 A | 2/1983 | DeVecchi |
| 4,409,889 A | 10/1983 | Burleson |
| 4,427,427 A | 1/1984 | DeVecchi |
| 4,526,592 A | 7/1985 | Armbruster |
| 4,548,068 A | 10/1985 | Gualtieri et al. |
| 4,548,627 A | 10/1985 | Landy |
| 4,549,472 A | 10/1985 | Endo et al. |
| 4,557,184 A | 12/1985 | Orii et al. |
| 4,560,395 A | 12/1985 | Davis |
| 4,603,618 A | 8/1986 | Soltis Charles W. |
| 4,608,066 A | 8/1986 | Cadwell, Jr. |
| D287,621 S | 1/1987 | Shields |
| 4,637,301 A | 1/1987 | Shields |
| 4,664,477 A | 5/1987 | Andrieu et al. |
| 4,667,580 A | 5/1987 | Wetzel |
| 4,671,811 A | 6/1987 | Cadwell, Jr. et al. |
| 4,705,066 A | 11/1987 | Gut et al. |
| 4,723,480 A | 2/1988 | Yagi et al. |
| 4,732,591 A | 3/1988 | Tujisawa et al. |
| 4,732,592 A | 3/1988 | Spengler |
| 4,747,857 A | 5/1988 | Andrews |
| 4,749,385 A | 6/1988 | Brunner et al. |
| 4,790,080 A | 12/1988 | Detzer et al. |
| 4,790,863 A | 12/1988 | Nobiraki et al. |
| 4,804,392 A | 2/1989 | Spengler |
| 4,832,717 A | 5/1989 | Peters |
| 4,838,150 A | 6/1989 | Suzuki et al. |
| 4,838,910 A | 6/1989 | Stollenwerk et al. |
| 4,841,847 A | 6/1989 | Hirayama |
| 4,850,268 A | 7/1989 | Saito et al. |
| 4,851,018 A | 7/1989 | Lazzari et al. |
| 4,854,224 A | 8/1989 | Hirayama |
| 4,860,643 A | 8/1989 | Spearow |
| 4,898,089 A | 2/1990 | Roos |
| 4,917,713 A | 4/1990 | Helmus |
| 4,927,438 A | 5/1990 | Mears et al. |
| 4,976,815 A | 12/1990 | Hiratsuka et al. |
| 5,002,455 A | 3/1991 | Kuriyama et al. |
| 5,014,608 A | 5/1991 | Benson et al. |
| 5,029,518 A | 7/1991 | Austin |
| 5,083,558 A | 1/1992 | Thomas et al. |
| 5,167,575 A | 12/1992 | MacDonald |
| 5,167,577 A | 12/1992 | Kristensson |
| 5,169,418 A | 12/1992 | Honda et al. |
| 5,195,922 A | 3/1993 | Genco |
| 5,219,464 A | 6/1993 | Yamaga et al. |
| 5,232,401 A | 8/1993 | Fujita et al. |
| 5,299,584 A | 4/1994 | Miyazaki et al. |
| 5,314,377 A | 5/1994 | Pelosi, III |
| 5,316,560 A | 5/1994 | Krone-Schmidt et al. |
| 5,326,316 A | 7/1994 | Hashimoto et al. |
| 5,336,128 A | 8/1994 | Birdsong |
| 5,399,319 A | 3/1995 | Schoenberger et al. |
| 5,401,212 A | 3/1995 | Marvell et al. |
| 5,407,389 A | 4/1995 | Poblete et al. |
| 5,413,527 A | 5/1995 | Dansui et al. |
| 5,413,529 A | 5/1995 | Aragon |
| 5,425,793 A | 6/1995 | Mori et al. |
| 5,431,599 A | 7/1995 | Genco |
| 5,464,029 A | 11/1995 | Rentz |
| 5,464,475 A | 11/1995 | Sikes et al. |
| 5,470,363 A | 11/1995 | Leader et al. |
| 5,487,768 A | 1/1996 | Zytka et al. |
| 5,511,594 A | 4/1996 | Brennan et al. |
| 5,518,450 A | 5/1996 | Paveliev |
| 5,518,451 A | 5/1996 | Renz et al. |
| 5,522,767 A | 6/1996 | Rertsche et al. |
| 5,558,112 A | 9/1996 | Strieter |
| 5,620,369 A | 4/1997 | Spransy et al. |
| 5,641,354 A | 6/1997 | Sakauchi et al. |
| 5,660,585 A | 8/1997 | Swoboda et al. |
| 5,664,995 A | 9/1997 | O'Keefe |
| 5,665,128 A | 9/1997 | Peters et al. |
| 5,700,190 A | 12/1997 | Johnson et al. |
| 5,704,833 A | 1/1998 | Reix et al. |
| 5,711,705 A | 1/1998 | Krainiak et al. |
| 5,713,791 A | 2/1998 | Long et al. |
| 5,725,426 A | 3/1998 | Alvarez |
| 5,730,765 A | 3/1998 | Henry et al. |
| 5,730,777 A | 3/1998 | Petersen et al. |
| 5,772,738 A | 6/1998 | Muraoka |
| 5,807,414 A | 9/1998 | Schaefer |
| 5,814,116 A | 9/1998 | Schneider et al. |
| 5,827,118 A | 10/1998 | Johnson et al. |
| 5,827,339 A | 10/1998 | Nagafune et al. |
| 5,833,727 A | 11/1998 | Skarsten |
| 5,858,041 A | 1/1999 | Luetkemeyer |
| 5,876,279 A | 3/1999 | Renz et al. |
| 5,910,598 A | 6/1999 | Shofner et al. |
| 5,912,184 A | 6/1999 | Young |
| 5,944,602 A | 8/1999 | Grundy |
| 5,960,638 A | 10/1999 | McCabe et al. |
| 5,964,910 A | 10/1999 | Keele |

OTHER PUBLICATIONS

Mini Environment, Shinsung Co., LTD, http://clean.shinsung.com.kr/eng/Product/Mini/proMini.asp, printed Sep. 26, 2001, 1 total page.

Mini Environment brochure, Shinsung Co., LTD, 1999, 6 total pages.

HEPA—Station, Enclosure System, Model XV–600, Servicor, 1998, 2 total pages.

Stratotech Corporation web site, http://www.stratotech.com/, printed Feb. 27, 2000, 8 total pages.

Absolute, Absolute Control Systems, Inc. web site, http://ww.absolutecontrolsys.com/, printed Feb. 27, 2001, 23 total pages.

Liberty Industries, Cleanroom, Laminar Flow, Accessories catalog, Liberty Industries, 1998/99, pp 10, 20–30.

Purified microEnvironmentsweb site, http://www.purfied.com/, printed Feb. 27, 2000, 58 total pages.

MAC 10 e3, Exceptionally Energy Efficient Fan Filter Unit brochure, Envirco Corporation, 1998, 4 total pages.

Envirco Corporation Mac 10 units confidential pricelists, Feb. 4, 1999, 10 total pages.

CleanRooms, vol. 13, No. 9, Sep. 1999, pp 1, 26, and 37.

CleanRooms, vol. 13, No. 10, Oct. 1999, 3 total pages.

CleanRooms, vol. 13, No. 8, Aug. 1999, 3 total pages.

CleanRooms, vol. 13, No. 11, Nov. 1999, pp 1, 39–41.

Clean Zone Technology, LLC, http://www.stratoclean.com/, printed Feb. 27, 2000, 8 total pages.

Envirco Corporation engineered drawing of Mac 10 2×5 standard, Apr. 25, 2000, 1 total page.

Envirco Corporation set of engineered drawings of Mac 10 2×4 RSR and technical data, Sep. 1997, 9 total pages.

Stratotech Corporation set of engineered drawings, 1999, 172 total pages.

US Provisional Patent Application Ser. No. 60/131,461, filed Apr. 28, 1999, entitled "Adjustable Clean–Air Flow Material Handling Environment".

PCT Patent Application No. PCT/US00/11736, filed Apr. 29, 2000, entitled "Adjustable Clean–Air Flow Environment".

ADJUSTABLE CLEAN-AIR FLOW ENVIRONMENT

This application is the United States National Stage of International Application No. PCT/US00/11736, filed Apr. 28, 2000 which claims the benefit of U.S. Provisional Application No. 60/131,461, filed Apr. 28, 1999, hereby incorporated by reference.

TECHNICAL FIELD

Generally, the invention relates to enclosures having adjustable clean gas flow environments and methods of enclosed pressure differential distribution technology. Specifically, clean gas flow enclosures, which provide for isolation of materials from airborne micro-particulate contamination.

BACKGROUND

Clean (or filtered) gas flow material handling systems are used in manufacturing to isolate clean materials from contamination by airborne macro-particulates or micro-particulates. There are three major categories of smaller filtered gas flow material handling systems, which are categorized based on the type of air flow: 1) Vertical Laminar Flow, 2) Horizontal Laminar Flow, and 3) Exhaust or Fume hoods. Each of the three types of devices have advantages depending on the various types of material handling application requirements. A focus of some of the embodiments of this invention are on the vertical laminar flow and the horizontal laminar flow categories. Particular embodiments of the invention encompass small, modular, reconfigurable, filtered gas flow environments for isolating materials from airborne particulate contamination. Smaller filtered gas flow environments are desirable because they eliminate many problems with larger clean room environments.

A significant problem with large clean room environments may be that gas must be filtered and moved long distances, while passing by people, machines, and open space. It is difficult to maintain such a gas flow and keep it within the Federal Standard 209 guidelines for particulate contamination. Federal Standard 209E, *Airborne Particulate Cleanliness Classes in Cleanrooms and Clean Zones*, 1992 hereby incorporated by reference. It can be even more difficult to stay within these guidelines at the work surface or within the work zone. Smaller clean air environments that move gas a shorter distance, and remove people and machines out of the airflow path are generally less costly and provide cleaner air within the work zone (or filtered gas flow space). In addition, it is much easier to direct and maintain the desired gas flow when moving air a shorter distance because the gas flow has fewer opportunities to encounter the gas currents and eddies that are produced by people moving inside a larger clean environment.

Another significant problem with clean room environments may be that it is more costly to maintain clean room environments, than a smaller, more modular clean environments. Clean rooms typically require people and machines to be totally immersed in the filtered gas flow. This requires additional space or cost for facilities and supplies. The people in clean rooms are required to wear clean room suits, shoes, gloves, masks, hair-covers, and other specialized equipment while inside the clean room environment. This also requires a changing room for people to enter and exit through and the changing room is usually accompanied by an gas-shower to blow off contamination being carried on clothing. In addition, this means that there must be aisle ways, standing or sitting areas, or the like that are part of the clean environment further adding to possible sources of contamination or adding additional cost to the clean room solution. By comparison, smaller clean environments that do not require the person to be totally immersed in the filtered gas flow can greatly reduce the need for these non-value added costs while providing a more human friendly environment to work in. See also, Adjustable Clean Air Flow Material Handling Environment, U.S. patent application 60/131,461 herein by incorporated by reference.

Even though small clean environments are desirable and generally used in manufacturing processes which require filtered gas environments, there are major problems which remain unresolved in the small clean environment industry.

A first problem can be the incompatibility of different clean environment enclosures which can be different shapes and sizes and may not be designed for being coupled or linked together. Interior and exterior dimensions vary considerably from manufacturer to manufacturer, and even between clean environment enclosures from the same manufacturer. These variations impose numerous problems with respect to material handling since even working surface heights may differ by inches, or the overall depth from one clean environment enclosure to the next may differ by several inches. In addition, even where the overall dimensions are compatible there may not be compatible side access panels on certain units which may prohibit linking units together in a side-by-side arrangement. Accommodating these variations may lead to wasted factory floor space which may not be reclaimed.

A second problem can be that existing clean enclosures do not distribute filtered gas to the entire surface of the gas flow delivery panel (or perforated plenum panel) adjoined to the clean work zone (or filtered gas flow space). In many existing arrangements the filtered gas is distributed within a static regain space of a plenum. The plenum has a perforated surface to deliver the filtered gas as a flow to the filtered gas flow space. Often the configuration of the static regain space prevents the flow of the filtered gas to distribute to the entire surface of the perforated plenum adjoined to the static regain space. As such, the filtered gas may not enter the filtered gas flow space from the entire surface area of the perforated plenum panel. This may result in only a portion of the surface of the perforated plenum panel delivering filtered gas to the filtered gas flow space. As shown for example in U.S. Pat. No. 4,927,438, the gas flow is directed substantially horizontally within a top plenum space which then delivers the gas flow substantially vertically into the filtered gas flow space. A rectangular plenum space with a dead end as shown often does not allow distribution of gas flow over the entire surface of the filter (28) or to the entire surface of the perforated plenum panel adjoining the plenum space.

A third problem can be that existing clean environment enclosures do not adjoin the perforated surface of the plenum to the entire flow path defined by the filtered gas flow space. As shown by U.S. Pat. Nos. 4,927,438; 5,326,316; and 5,487,768, the surface of the perforated plenum panels adjoined to the filtered gas flow space do not adjoin to either the entire height and width of the horizontal flow path defined by the filtered gas flow space (as disclosed by U.S. Pat. Nos. 5, 487,768 and 4,927,438), or to the entire depth and width of the vertical flow path defined by the clean work zone (as disclosed by U.S. Pat. Nos. 5,326,316 and 4,927,438).

A fourth problem can be that existing clean environment enclosures do not allow selectable gas flow within the filtered gas flow space of the clean environment enclosures. Presently, a single clean environment enclosures may not exist which allows for routine adjustment between horizontal gas flow, vertical gas flow, or a combination of both horizontal and vertical gas flow within the same filtered gas flow space. As shown by U.S. Pat. Nos. 4,557,184 and 3,895,570, the clean environment enclosures only allow for gas flow in the vertical flow path of the clean work zone.

A fifth problem can be that existing clean environment enclosures do not provide filtered gas flow having a substantially uniform velocity from the entire surface of the perforated plenum panel adjoined to the filtered gas flow space. This may be particularly true when the or filtered gas flow has a first direction of flow from the gas flow generator and a second direction of flow at the surface of the perforated plenum panel adjoined to the filtered gas flow space.

A sixth problem can be that existing clean environment enclosures do not position the area of minimum velocity in the filtered gas flow space at a location most distal from the access to the filtered gas flow space. As disclosed by U.S. Pat. No. 4,557,184, as an example, the area of lowest velocity within the clean work zone may be at the bottom rear of the filtered gas flow space. This may be the case because the enclosure only delivers filtered gas flow to the vertical flow path and the flow exits from the front access open area. The path of least resistance to gas flow (path having highest velocity) may run from the perforated plenum panel to the access open area decreasing in velocity toward the back of the enclosure as the flow arrows indicate.

A seventh problem can be that existing clean environment enclosures may not be adjusted to allow gas flow having velocity gradient substantially symmetrical about a plane which bisects the clean work zone in a diagonal fashion. As such, there may be irregular gas flow characteristics within the filtered gas flow space which may make it difficult to predict the gas flow velocity at any particular area within the filtered gas flow space. As such, the filtered gas flow within the filtered gas flow space may be unsuitable for particular applications, or may be difficult to tailor for particular applications.

An eighth problem can be that existing clean environment enclosures do not address the need for flexibility to accommodate changes in manufacturing processes and to accommodate shifts in market demand as products proceed through their life cycle. When manufacturing processes or demands change it creates demands for expanding or contracting clean space in laboratories or manufacturing facilities. These expansions and contractions typically require additional purchases of equipment (i.e. vertical or horizontal clean environment enclosures) or clean room reconstruction activities and may also require unneeded equipment to stand idle or be stored pending possible future use. Similarly, during multiple step manufacturing processes, there may be different needs for either vertical or horizontal gas flow or the combination of both depending on the product, tooling, processing requirements, and the like. As such, having flexibility in accommodating these requirements and changes with regard to clean space provides a competitive advantage for the manufacturer.

As to each of these problems and the overall desire to provide enclosures having adjustable filtered gas flow that provide enclosed pressure differential distribution technology for both larger, and for smaller versatile clean gas handling systems, the present invention provides both apparatus and methods which address each of the problems in a practical fashion.

DISCLOSURE OF INVENTION

Enclosures having adjustable filtered gas flow environments and methods of enclosed pressure differential distribution technology provide material handling substantially free from airborne particulate contamination.

The broad object of particular embodiments of the invention can be to provide class 10 to class 1,000 environments (according to Federal Standard 209E) inside an enclosed filtered gas flow space while the surrounding air quality may be class 200,000 or better.

A second broad object of particular embodiments of the invention can be to allow an operator to be external from the filtered gas flow space. Only the operator's hands and a portion of the arms may be inside the filtered gas flow space and down stream from the material being isolated from airborne micro-particulates. This approach eliminates many of the costs and constraints of a clean room environment, including gowning areas, air showers, clean room suits, or the like. Operator comfort or ergonomics may also be addressed when the operator is external to the filtered gas flow space.

A third broad object of particular embodiments of the invention can be that the system is modular and can be easily moved and rearranged without major construction efforts or structural incompatibilities. The invention may be configured to be utilized as both a single material isolation device or in a multi-station material isolation device, utilizing multiple such modules. Additional options may be purchased to convert the system, for example, if a sealed front panel is required, the front panel and window assembly may be removed and replaced by a sealed front panel. If the sealed front panel is required, a perforated table top may allow for single pass filtered gas to exit the filtered gas flow space. The elimination of having to purchase multiple types of systems or elimination of the efforts of trying to link different brands of units together can be a major benefit of the invention which can greatly increase asset utilization.

Another broad goal of particular embodiments of the invention can be to provide vertical laminar flow, horizontal laminar flow, or a combination of both vertical laminar flow and horizontal laminar flow within the same filtered gas flow space by making routine adjustments to the enclosure. The type of gas flow selected can be based upon the type of material being handled, the process requirements, or both. The optimum airflow for any given project may be dependent upon many factors, such as the size and shape of the target object being worked upon, as well as the size and shape of the process tooling. In many, but not all, instances a combination of vertical and horizontal gas flow may be optimal. Once the decision has been made as to the type of gas flow that may be optimal, the invention allows the customer to make a few minor adjustments to the apparatus to achieve the optimal gas flow via the use of the selectable gas flow mechanisms.

Another significant object of particular embodiments of the invention can be to configure plenums which distribute filtered gas flow from the gas flow generator to the entire surface of the perforated plenum panel adjoined to the plenum space.

Another significant object of particular embodiments of the invention can be to adjoin the perforated surface of the plenum to the entire flow path (horizontal or vertical or otherwise) defined by the filtered gas flow space.

Another significant object of particular embodiments of the invention can be to deliver filtered gas flow from the perforated surface of the plenum adjoined to the gas flow space at a substantially uniform velocity.

Another significant object of particular embodiments of the invention can be to configure plenums which convert filtered gas flow from the gas flow generator having a first direction of flow to a second direction of flow at the perforated surface of the plenum adjoined to the filtered gas flow space. This object of the invention may also include the above-mentioned objects of the invention such as distributing filtered gas to the entire surface area of the perforated surface of the plenum that adjoins the plenum space, and providing substantially uniform gas velocity at the perforated surface of the plenum that adjoins the filtered gas flow space.

Another significant object of particular embodiments of the invention can be to position the filtered gas flow of lowest velocity at a location within the filtered gas flow space that is most distal from the primary access opening to the filtered gas flow space.

Another significant object of particular embodiments of the invention can be to provide a filtered gas flow within the filtered gas flow space having substantial symmetry about a plane that projects from the area of lowest velocity within the filtered gas flow space and substantially bisects the primary access opening.

Yet another object of particular embodiments of the invention can be to allow for easy room-side maintenance which reduces equipment down time. There may be easy access to the gas filters for more frequent or easier preventive maintenance. There may also be a utilities attachment panel on top of the unit that allows for easy hook-up of power and other attachments which go to the control panel or optional utility ports.

Still another object of particular embodiments of the invention can be to allow convenient material handling or material movement from one linked unit to another, into and out of the unit, from the front, side, or back. Other embodiments of the invention of may include rear access doors for material entry or exit as well as alternate types of side panels allowing for side to side material passage. Material may also be moved through the front access panel. Each unit may have a table or work surface (or bottom panel) placed within it. The design allows for custom tables, conveyor systems, standard clean room type tables, special equipment with no tables and built-in tables.

Naturally, further objects of the invention are disclosed throughout other areas of the specification and drawings.

MODE(S) FOR CARRYING OUT THE INVENTION

The invention constitutes a pressure differential distribution enclosure and methods which disclose how to make and how to use pressure differential distribution enclosure technology. Specifically, pressure differential distribution enclosure technology relating to filtered gas flow material handling environments.

The basic concepts of pressure differential distribution enclosure technology, or as it may relate to filtered gas flow material handling environments are to be understood as applicable to a variety of circumstances where the distribution of gas pressure or the distribution of gas velocity within an enclosure may be desired, for example, clean room technology, fume hood technology, material handling, or material containment technology, or the like, as would be readily understood by those skilled in the arts.

Moreover, while this disclosure provides specific descriptions of embodiments of apparatus and methods relating to pressure differential distribution enclosures, or filtered gas flow material handling environments as examples, the description of these embodiments is not meant to reduce the scope of the invention to such examples. As can be easily understood, the basic concepts of the present invention may be embodied in a variety of ways. The invention involves both methods as well as apparatus to accomplish the appropriate methods. In this application, the methods are disclosed as part of the results shown to be achieved by the various apparatus described and as steps which are inherent to utilization. They are simply the natural result of utilizing the devices as intended and described. In addition, while some particular embodiments of the invention are disclosed to accomplish certain methods described, it would be understood that these can be varied in a number of ways. Importantly, as to all of the foregoing, all of these facets should be understood to be encompassed by this disclosure.

The pressure differential distribution enclosure concept incorporates various gas pressure distribution, gas velocity distribution, or gas filtering aspects which can be used either independently or in combination to define the gas flow environment within an interior volume of an enclosure (or an interior volume) from the gas flow environment external to the enclosure (or an exterior volume), or to moderate the gas flow environment within the interior volume (or the filtered gas flow space).

Figure 1:
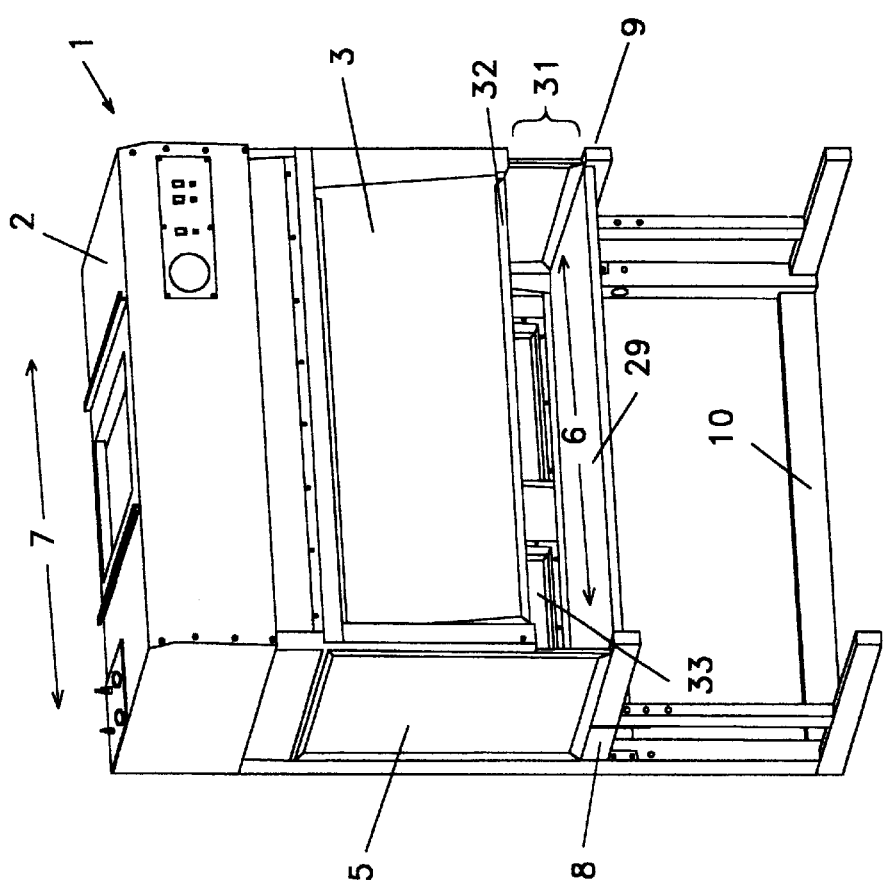
FIG. 1 shows a perspective view of an embodiment of the invention.

As shown in FIG. 1, an embodiment of the invention may comprise a panel assembly (or frame assembly) (1) of substantially polygonal geometry having at least a top panel (2), a front panel (3), a rear panel (4), and a pair of side panels (5) which define an interior volume (6) from an exterior volume (7). The panels may be made from a suitable material such as sheet metal, plastic, or glass or a combination of the same. In the embodiments of the invention shown in FIGS. 1 through 4, a left side frame (8) and a right side frame (9) made of tubular metal, sheet metal, or plastic, or the like are held in a vertical and parallel orientation by cross frame components (10) made of similar material. Panels are then secured to the frame assembly by hardware as would be well known to those with skill in the art. Details regarding the assembly of particular embodiments of the invention may be found in the reference entitled, *Mini-Environment Assembly*, DBM Technologies, Inc., 1055 Delaware Avenue, Longmont, Colo. 80501, task descriptions encompass pages 1–25, and accompanying photographs pages 1–109, (1999) are hereby incorporated by reference.

Figure 4:
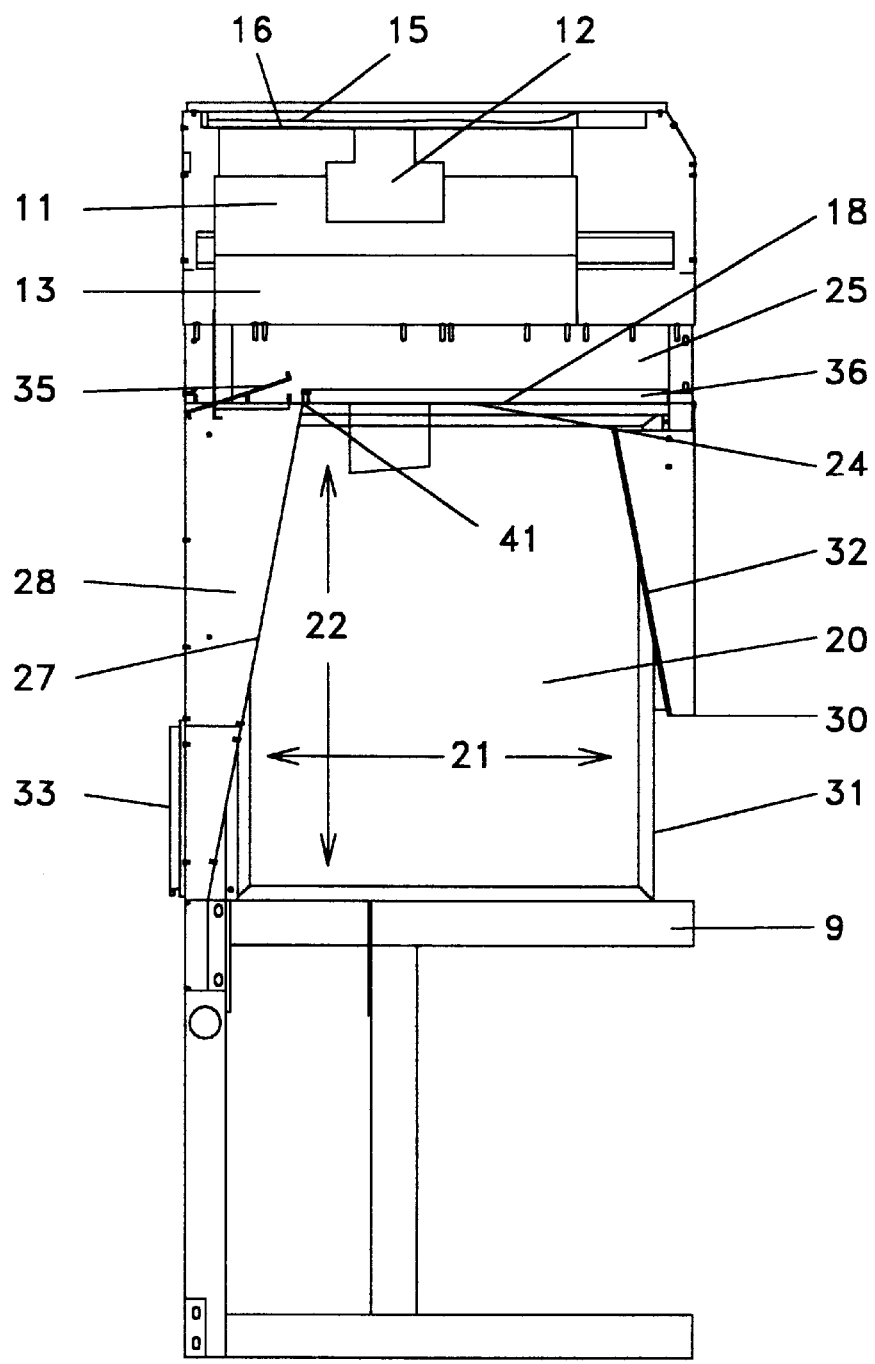
FIG. 4 shows a cross section view of an embodiment of the invention.

First referring to FIG. 4, a filtered gas delivery assembly (11) can be fluidicly coupled to the panel assembly (1). The filtered gas delivery assembly comprises a gas flow generator (12) which establishes a gas flow from the exterior volume to the interior volume defined by the panel assembly. The gas flow generator may be located at a distance from the panel assembly as part of a general gas circulation system within a building, or may be a gas flow generator that services a single pressure differential distribution enclosure (or panel assembly). The gas flow may be fluidicly coupled to the interior volume of the enclosure at any panel. As such, the gas flow may have a first direction of gas flow within the interior volume which may be horizontal or vertical or a combination of both components. Again referring to FIG. 4, one embodiment of the invention may have the gas flow generator (12) built within the panel assembly (1) above the interior volume with the direction of the gas flow in the vertical direction. Specifically, the gas flow filter assembly can include at least one MAC-10 model unit as produced by Envirco having a gas flow rate of about 90 feet per minute. *MAC 10 Brochure*, Envirco Corporation, 6701 Jefferson, NE, Albuquerque, N.Mex. 87109, pages 1–4 (1998) hereby incorporated by reference.

FIG. 4 also shows an embodiment of the invention further comprising a gas filter (13) responsive to the gas flow from the exterior volume (6) to the interior volume (7). The gas filter (13) may be located before, or may be located after the gas flow generator relative to the enclosure. The gas filter responsive to the gas flow from the exterior volume to the interior volume may comprise a Hepa filter, or a Ulpa filter, or other type of macro-particulate or micro-particulate filter. Additional prefilters (14) may also be used to capture particles in the gas flow prior to entering the gas flow generator (12), or may be used prior to the gas filter (13). In the embodiment of the invention shown in FIG. 4, unfiltered gas is drawn into the first stage prefilter (15) then through the second stage prefilter (16) and then through the gas flow generator (12). The prefiltered gas is then forced through the gas filter (13) (Hepa filter, or Ulpa filter, or other type filter). Filtered gas (which may have up to 99.99% of all particles as small as approximately 0.3 microns removed from the gas flow when a HepaFilter is used, and which may have up to 99.99% of all particles as small as approximately 0.12 microns removed from the gas flow when a UlpaFilter is used) can then be delivered into the interior volume (6) of the panel assembly (1).

A plenum (17) having a perforated plenum panel (18) can be configured to distribute the filtered gas flow from a plenum space (19) to a filtered gas flow space (20) within the interior volume of the enclosure. The plenum space (19) and the filtered gas flow space (20) can adjoin opposed surfaces of the perforated plenum panel (18). The perforated plenum panel can define a plenum space which may deliver filtered gas flow to a substantially horizontal flow path (21) within the gas filtered flow space (20), or the perforated plenum panel can define a plenum space which can deliver filtered gas flow to a vertical flow path (22) within the filtered gas flow space (20). The perforated plenum panel can have a perforated surface area adjoined to substantially the entire width and depth of the filtered gas flow space to deliver filtered gas to the entire vertical flow path defined by the filtered gas flow space (or can have perforated surface area adjoined to a portion of the width and depth of the filtered gas flow space to deliver filtered gas to a portion of the vertical flow path). Similarly, the perforated plenum panel can have a perforated surface area adjoined to substantially the entire width and height of the gas flow space to deliver filtered gas to the entire horizontal flow path defined by the gas flow space (or can have perforated surface area adjoined to a portion of the width and height of the gas flow space to deliver filtered gas to a portion of the horizontal flow path). In this fashion the perforated surface of the perforated plenum panel can deliver filtered gas to substantially the entire height and substantially the entire width of the horizontal flow path (21) within the filtered gas flow space (20), or to substantially the entire width and substantially the entire depth of the vertical flow path (22) within the filtered gas flow space (20).

In one embodiment of the invention, the plenum (17) may also comprise a first plenum (23) fluidicly coupled to the filtered gas delivery assembly (11) where the first plenum has a first perforated plenum panel (24) having opposed surfaces respectively adjoined to a first plenum space (25) and to a vertical flow path (22) within the filtered gas flow space (20), and where a second plenum (26) has a second perforated plenum panel (27) having opposed surfaces respectively adjoined to a second plenum space (28) and to a horizontal flow path (21) within the filtered gas flow space (20). As shown in FIG. 4, the second plenum space may be fluidicly coupled to the first plenum space, however, the two plenum spaces could have independent sources of filtered gas flow as well.

Figure 8:
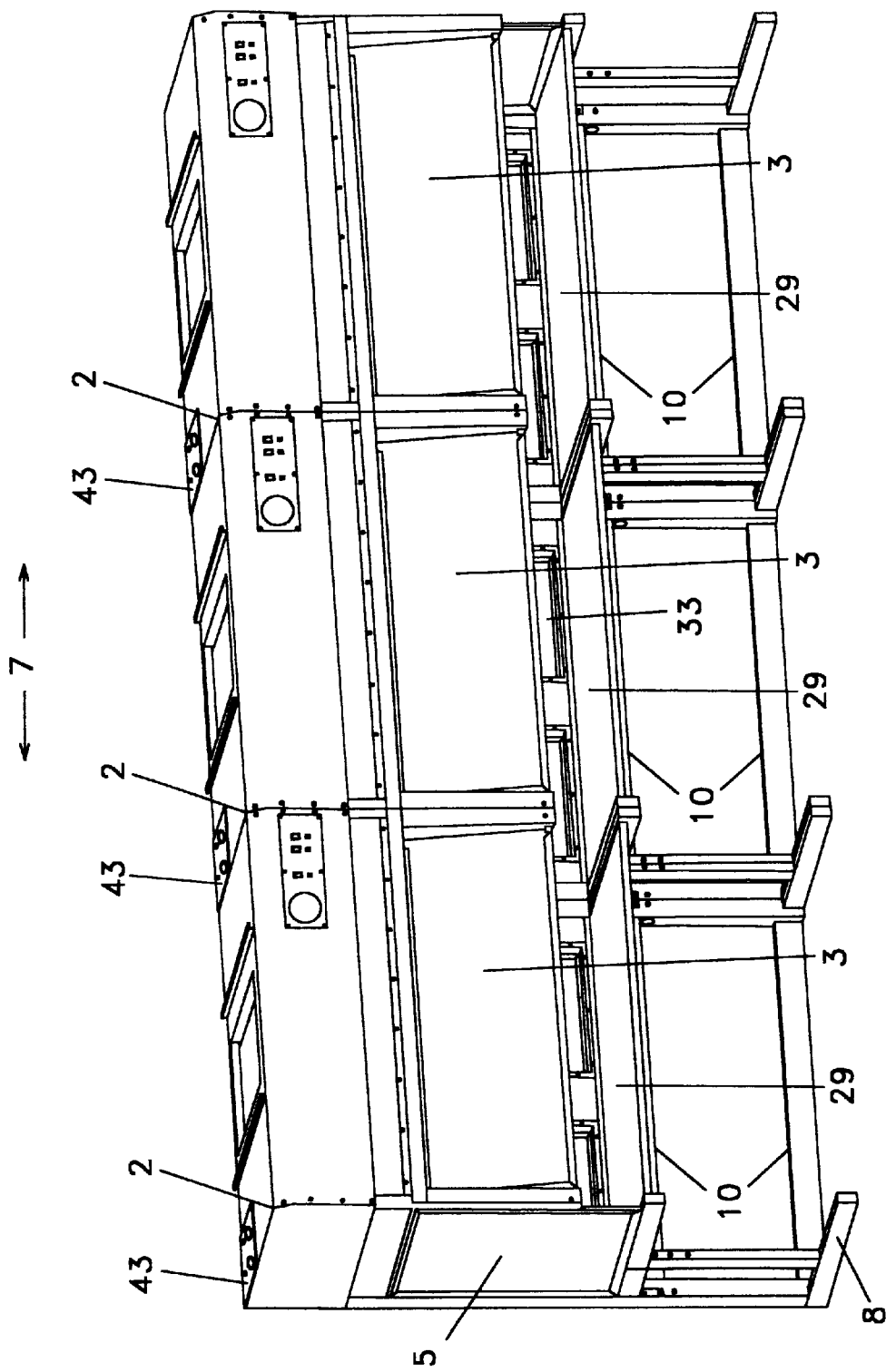
FIG. 8 shows an embodiment of the invention having a plurality of frame assemblies (or panel assemblies) coupled together.

Again referring to FIG. 4, for certain embodiments of the invention having either a single plenum adjoined to either a vertical flow path or adjoined to a horizontal flow within the filtered gas flow space, or where the invention has a first and a second plenum, the plenum (or the first plenum where there is a first plenum and a second plenum) can have a plenum space of substantially rectangular geometry with a height of between about six inches to about 24 inches between the plane where the gas flow enters the plenum (or first plenum space) and the perforated plenum panel (or first perforated plenum panel) surface adjoined to the vertical flow path or the horizontal flow path within the gas flow space. As the width of the plenum (or first plenum) increases, additional gas flow generators may be used to provide filtered air to the plenum. Referring to FIG. 8, some embodiments of the invention can have a gas flow generator that generates a gas flow of between about 70 feet per minute to about 150 feet per minute at intervals between about 55 inches to about 75 inches of linear width of the gas flow space. While FIG. 4 shows the first plenum space (25) at the top of the filtered gas flow space and delivering filtered gas to the vertical flow path (22), naturally the first plenum space could be oriented to deliver filtered gas to a flow path of any orientation within the filtered gas flow space.

Again referring to FIG. 4, the second perforated plenum panel (27) converts gas flow from a first direction of flow within the second plenum space (28) to a second direction of flow at the surface area of the second perforated plenum panel (27) adjoined to the filtered gas flow path within the filtered gas flow space (20). In the embodiment of the invention shown, a substantially vertical filtered gas flow within the plenum space can be converted to substantially horizontal filtered gas flow at the surface area of the second perforated plenum panel adjoined to substantially the entire height and substantially the entire width of the horizontal flow path within the gas flow space. Naturally, a single plenum may be used in this fashion where the filtered gas flow has a first direction of flow from the gas flow generator (12) and a second direction of flow within the filtered gas flow space (20).

Figure 5:
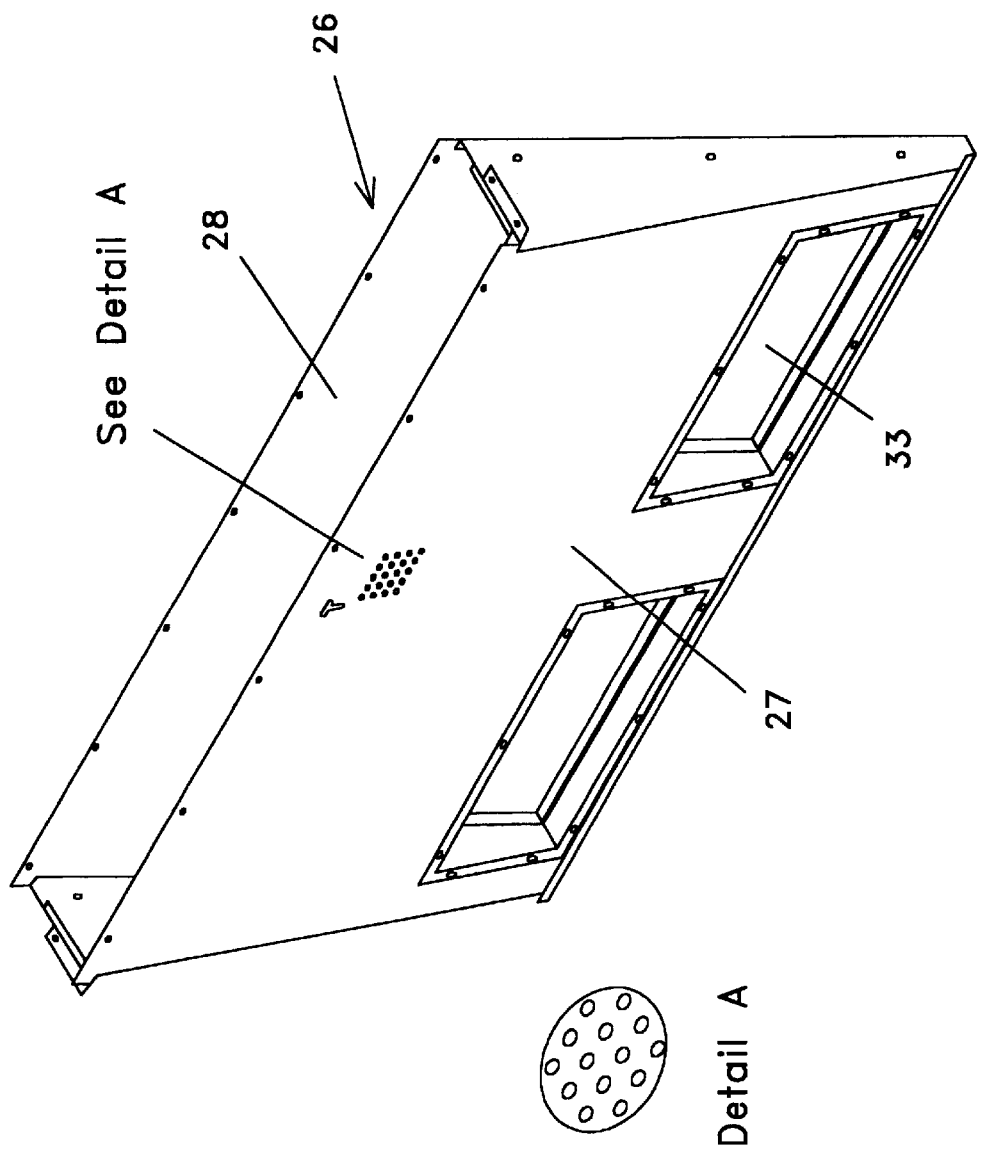
FIG. 5 shows an embodiment of a plenum having a particular static regain configuration.

The plenum (17) can further provide a static regain configuration (or configuration of the plenum that maintains substantially constant static pressure and substantially constant gas flow velocity to substantially the entire surface area of the perforated plenum panel adjoined to the plenum space). Where the filtered gas flow from the gas flow generator has the same direction of flow as that within the filtered gas flow space the plenum can have a static regain configuration that may be substantially rectangular in geometry having a height of between about six and about 24 inches as above-described. However, where the filtered gas flow from the gas flow generator has a first direction and the filtered gas flow from the surface of the perforated plenum panel adjoined to the filtered gas flow space has a second direction the static regain configuration may be significantly different for the plenum space to distribute the gas flow from the gas flow generator to substantially the entire area of the perforated plenum panel adjoined to the plenum space. As shown in FIG. 5, one embodiment of a static regain configuration can have a cross section which defines a right triangle having a base proximal to the gas flow generator, and with a vertex opposite the base having an angle of between about ten degrees to about thirteen degrees where the hypotenuse defines the plane of the perforated plenum panel. The apex of the right angle may be truncated sufficiently to allow the static regain configuration to deliver filtered gas to substantially the entire surface area of the perforated plenum panel (27) adjoined to the second plenum space (28). The dimensions of one embodiment of the static regain header above-described can have a right triangle with a base of about seven and three-quarters inches, a height of about 33 inches, and a truncated apex of about one and one-half inches (total volume of about 5 cubic feet). Naturally, as the dimensional geometry of the gas flow space varies the static regain configuration can vary in size and shape so as to distribute filtered gas to substantially the entire surface area of the perforated plenum panel adjoined to the plenum space.

The perforated plenum panel (18) may also be configured to deliver filtered gas having essentially uniform velocity over substantially the entire perforated surface area of the perforated plenum panel adjoining the gas flow space. Delivering filtered gas flow to substantially the entire surface area of the perforated plenum panel (18) adjoining the plenum space may not assure that the filtered gas will have essentially uniform velocity over the entire perforated surface area of the perforated plenum adjoining the gas flow space. As the dimensions or the geometry of the plenum space change, or the location of gas flow generator changes (assuming that filtered gas flow to substantially the entire surface of the perforated plenum panel has been achieved as above-mentioned), the angle of the perforated plenum panel (s) can be adjusted to further achieve substantially uniform velocity at the surface of the perforated plenum panel adjoined to the filtered gas flow path (20). For example, with respect to the second plenum (26) of the embodiment shown in FIG. 4, substantially uniform velocity of the gas flow to surface of the perforated plenum panel adjoining the horizontal flow path (21) of the filtered gas flow space (20) can be achieved with an angle of the perforated plenum panel (20) between about 10 degrees to about 13 degrees.

The amount of perforated surface can also be adjusted to help achieve distribution of filtered gas to substantially the entire surface area of the perforated plenum panel adjoined to the plenum space, and to help provide substantially uniform velocity at the entire surface area of the perforated plenum panel adjoined to the filtered gas flow space (20). For example, a plenum panel (or first plenum panel or second plenum panel) can have between about ten percent to about thirteen percent perforated surface.

The invention may further comprise a bottom panel (29). The bottom panel can be affixed to the panel assembly (1) by standard hardware, or the bottom panel (29) may be provided as a removable panel, or it may comprise a surface independent of the panel assembly (1) and moved into position under the filtered gas flow space (20). The bottom panel (29) can have a solid surface or the bottom panel can have a perforated surface that allows at least a portion of the gas flow within the gas flow space to pass through the bottom panel surface to the exterior volume (7). Naturally, the bottom panel (29) could be responsive to the horizontal flow path (21) or the vertical flow path (22) within the filtered gas flow space (20). The perforated area of the bottom panel (29) or could be within a range from zero to about 60%. Another embodiment of the invention could have a more restricted range between zero and about 20%.

Figure 2:
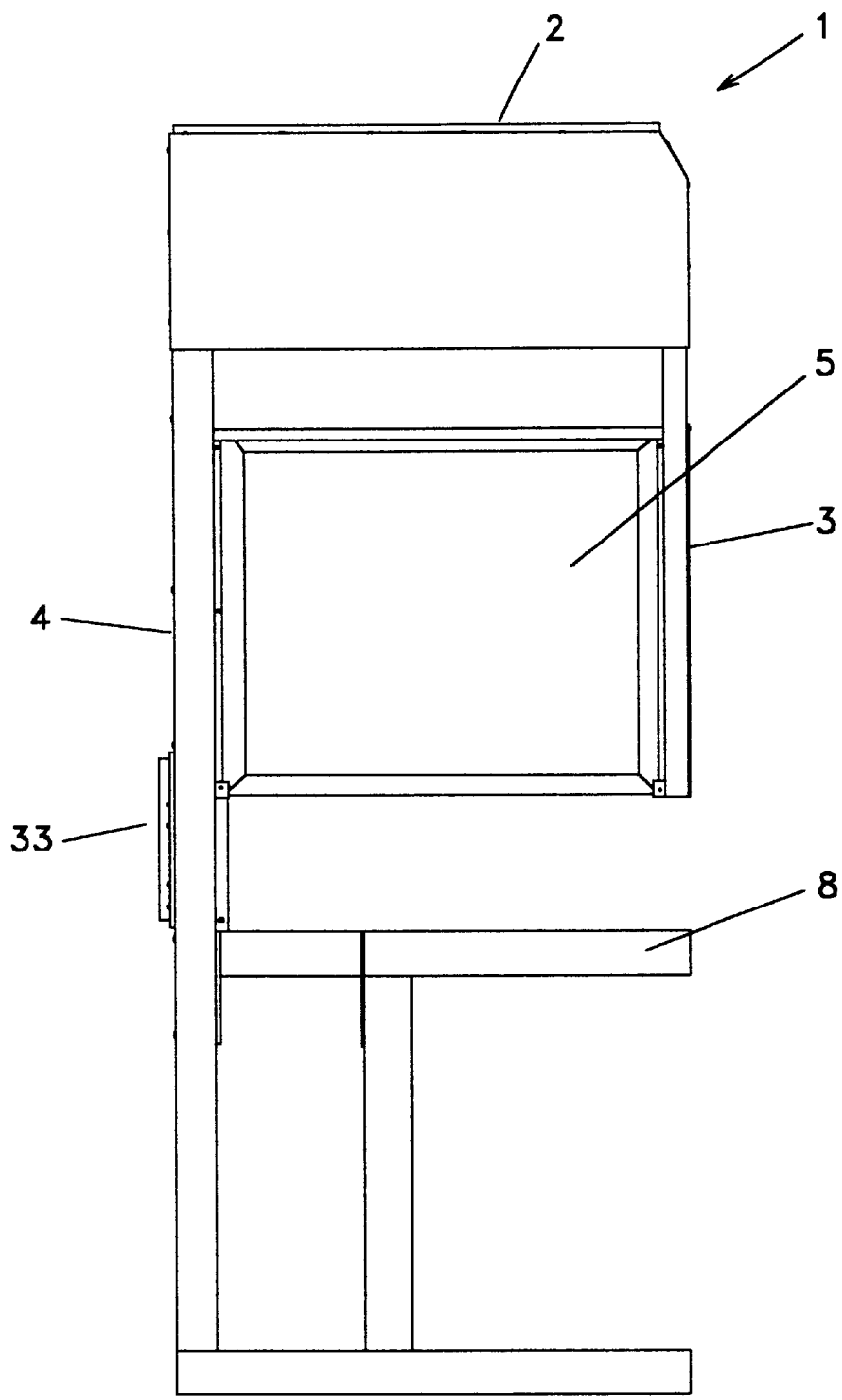
FIG. 2 shows a side view of an embodiment of the invention.
Figure 3:
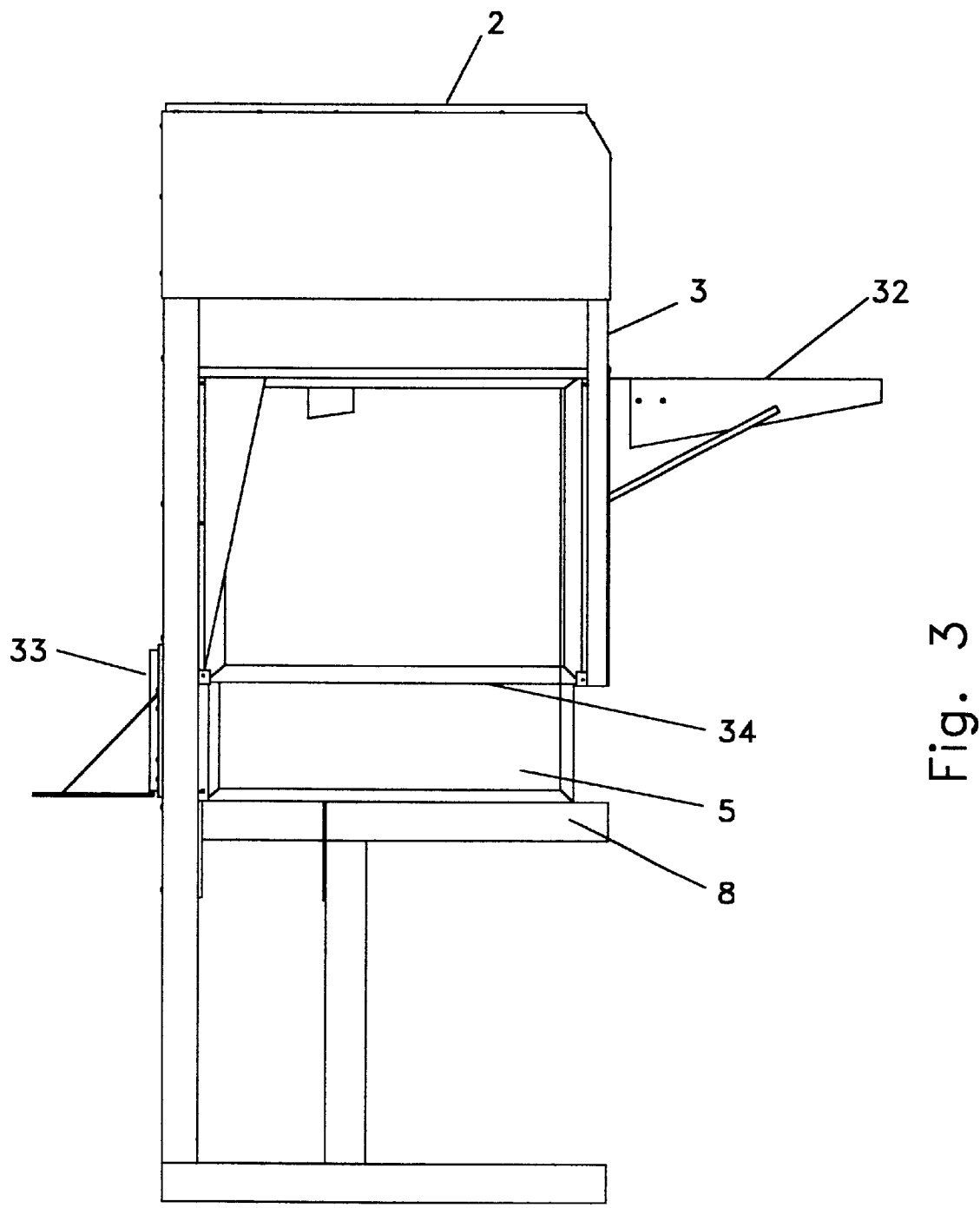
FIG. 3 shows a side view of an embodiment of the invention having a front panel access element in the open position.

The panel assembly (1) may further comprise an access element (30) coupled to the panel assembly (1). The access element (30) can be coupled to the front panel (3), the rear panel (4), to one side panel (5), or to both side panels. In certain embodiments of the invention, at least one access element may be coupled to the front panel (3) having an open area (31) substantially the width of the panel assembly (1), or substantially the width of the filtered gas flow path (21) (22) within the filtered gas flow space (20). The height of the open area (31) can be variably adjustable either by sliding a portion of the front access element (32), or by rotating the access element from a closed position to an open position. As shown in FIG. 3, a portion of the front access element (32) having substantially the width of the panel assembly (1) rotates from a closed position to an open position. In the closed position the open area of the front access element (32) can be between about eight inches to about 13 inches. In the open position, the open area (31) of the front access element (32) can be about 30 inches. The filtered gas flow at the open area can have a velocity of between about 75 feet per minute to about 130 feet per minute when the open area (31) of the access element (32) has a height of between about eight and 13 inches. It may be somewhat lower as the height of the open area of the access element (32) increases. The filtered gas flow at the open area (31) can have a velocity of between about 50 feet per minute to about 70 feet per minute when the open area (31) of the front access element (32) is open to about 30 inches. As shown in FIGS. 4, 5, and 8, the access element (30) can also comprise at least one rear access element (33), or as shown in FIG. 2 may comprise a side panel access element (34) or a side panel access element (34) at both side panels.

Particular embodiments of the invention may also include a closure (35) between the first plenum space (25) and the second plenum space (28). As shown in FIG. 4, the first plenum space (25) and the second plenum space (28) can be fluidicly coupled. A closure (35) between the two plenum spaces allows the filtered gas flow from the first plenum space (25) to the second plenum space (28) to be varied. Certain embodiments may have a closure (35) that has only an open position and a closed position. Alternately, the closure (35) may be selectably adjustable within the range from the open position from the closed position. The closure (35) as shown in FIG. 4, for example, can be a flat sheet rotatably coupled to the rear panel (4) of the enclosure allowing rotation from the open position to the closed position and vice-versa.

Figure 6:
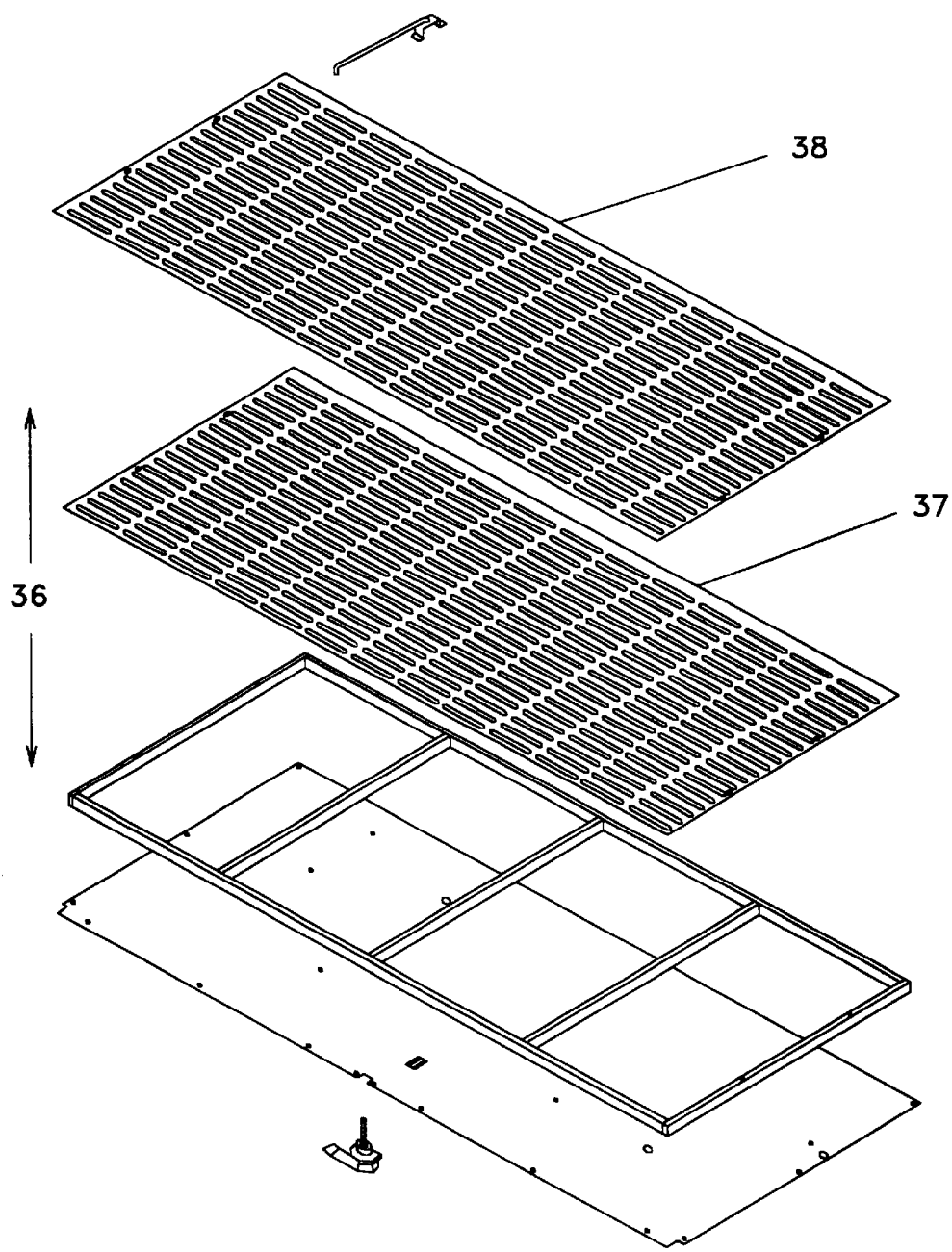
FIG. 6 shows an embodiment of a filtered gas flow interference assembly.

The invention can further include an adjustable gas flow interference assembly (36) responsive to the filtered gas flow at the perforated plenum panel. As shown in FIG. 6, the filtered gas flow interference assembly (36) can be comprised of a first filtered gas flow interference panel (or bottom gas flow interference panel) (37) having a perforated surface, and a second filtered gas flow interference panel (or top gas flow interference panel) (38) having a perforated surface. The filtered gas flow interference (36) assembly can be made responsive to at least a portion of the filtered gas flow from the plenum space to the filtered gas flow space (20). As such, the filtered gas flow interference assembly (36) can be responsive to the gas flow from a plenum that establishes a vertical filtered gas flow (22) within the filtered gas flow space (20), or responsive to the gas flow from a plenum that establishes a horizontal filtered gas flow (21) within the filtered gas flow space (20). Naturally, where the embodiment of the invention has a first perforated plenum panel (24) and a second plenum panel (27) the gas flow interference assembly (36) can be made responsive to the filtered gas flow from either the first perforated plenum panel, or the second perforated plenum panel, or more than one filtered gas flow interference assembly can be made responsive to the filtered gas flow from both perforated plenum panels. The filtered gas flow interference assembly (36) can have a location adjacent to the surface of the perforated plenum panel adjoining the plenum space, or in other embodiments of the invention, the filtered gas flow interference assembly can have a location adjacent to the surface of the perforated plenum panel adjoining the filtered gas flow space, or perhaps even both. The first filtered gas flow interference panel (37) having a perforated surface, and the second gas flow interference panel (38) having a perforated surface can be slidably responsive to vary the amount of the filtered gas flow. The amount of filtered gas flow from the plenum space to the filtered gas flow space (20) may be varied by sliding either filtered gas flow interference panel, or both gas flow interference panels, thereby juxtaposing at least a portion of the perforated surface area of the first gas flow interference panel with the perforated surface area of the second gas flow interference panel. By adjusting the amount of juxtaposed perforated surface area the amount of gas flow is varied. Where the non-perforated surface area of either filtered gas flow interference panel is juxtaposed to the entire perforated surface area of the other filtered gas flow interference panel the gas flow through the filtered gas flow assembly can be substantially eliminated.

By using the closure (35) and the filtered gas flow interference assembly (36) in combination as shown in FIG. 4, for example, a single gas filtered flow space (20) may have a substantially horizontal filtered gas flow (39), or a substantially vertical filtered gas flow (40), or both a horizontal and a vertical gas flow. By substantially eliminating the filtered gas flow to the second plenum space (28) by closing the closure (35) between the first plenum space (25) and the second plenum space (28), a substantially vertical gas flow (40) can be established within the filtered gas flow space (20) adjoining the first perforated plenum panel (24). Alternately, by substantially eliminating the filtered gas flow to the surface area of the first perforated plenum panel (24) adjoined to the first plenum space (25) with the filtered gas flow interference assembly (36) and opening the closure (35) to the second plenum space (28) a substantially horizontal flow (39) can be established in the filtered gas flow space (20). Or alternately, by substantially eliminating the filtered gas flow to the first plenum space (25) and eliminating filtered gas flow to the second plenum space (28) the filtered gas flow within the filtered gas flow space (20) can be substantially eliminated. Again, by opening the closure (35) between the first plenum space (25) and the second plenum space (28), and opening the filtered gas flow interference assembly (36) responsive to the filtered gas flow to the surface of the perforated plenum panel adjoined to the first plenum space (25), a vertical gas flow (40) and a horizontal gas flow (39) can be established during the same period within a single filtered gas flow space (20). By adjusting the gas flow interference panel (36) the filtered gas flow at the surface of the first perforated plenum panel (24) adjoined to the filtered gas flow space (20) can be between zero feet per minute to about thirty feet per minute with respect to the embodiment of the invention shown in FIGS. 1 to 4. By adjusting the closure (35) between the first plenum space (25) and the second plenum space (28) the filtered gas flow at the surface of the second perforated plenum panel (28) adjoined to the filtered gas flow space can be between zero feet per minute to about 45 per minute. FIGS. 9 to 16 are gas flow diagrams (vector diagrams) showing the direction and the velocity of the gas flow within the interior volume of the panel assembly. The vector diagrams show the direction and velocity of the filtered gas flow both in the plenum space and in the filtered gas flow space. Upon enlargement, the colored velocity indicia become a pattern of arrows indicating the direction and velocity of filtered gas flow.

Figure 9:
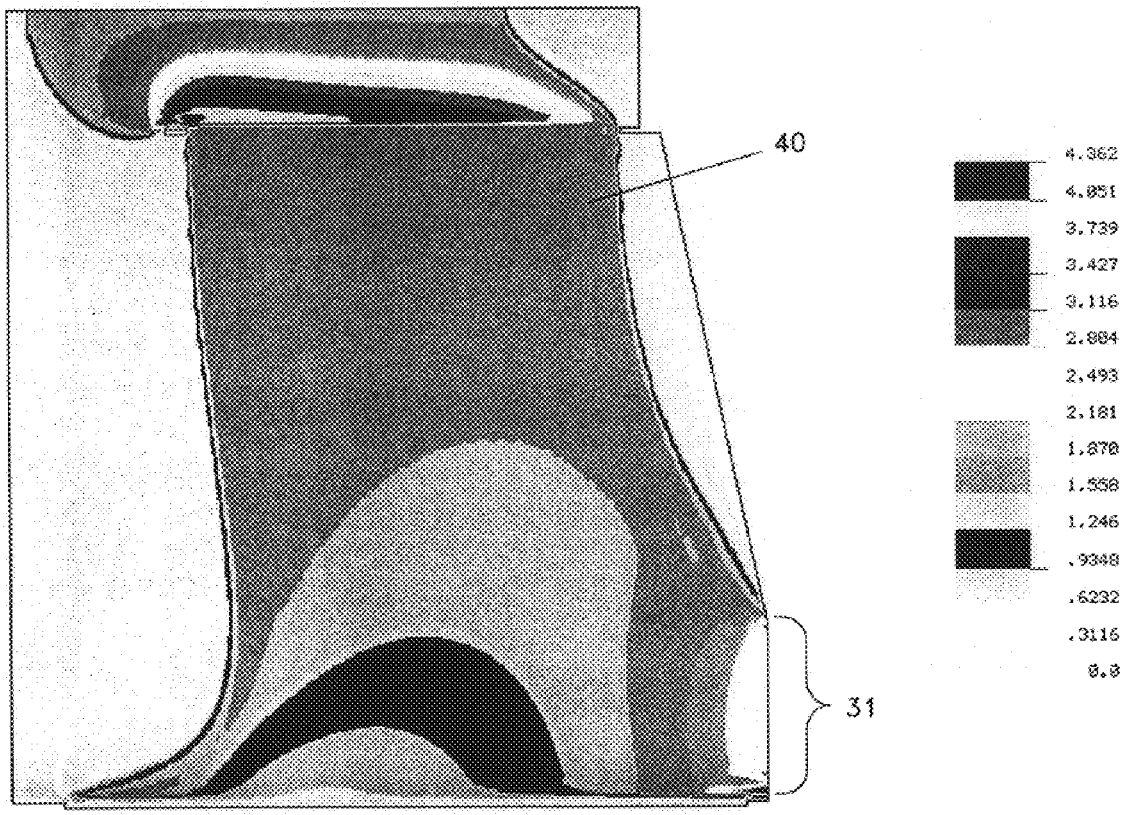
FIG. 9 shows a flow diagram (vector diagram) of an embodiment of the invention having a front panel access with an open area of between about eight inches to about thirteen inches providing a vertical filtered gas flow through the filtered gas flow space.
Figure 10:
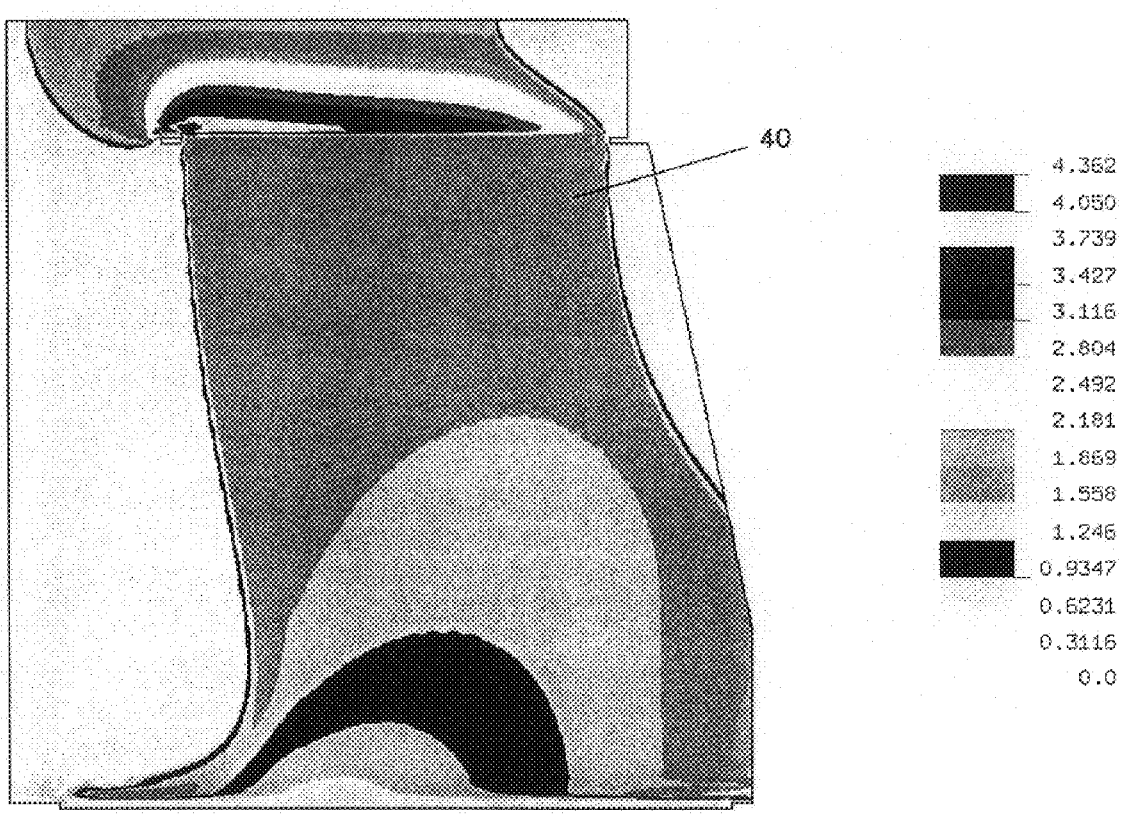
FIG. 10 shows a flow diagram (vector diagram) of an embodiment of the invention having a front panel access with an open area of about 30 inches providing a vertical filtered gas flow through the filtered gas flow space.
Figure 11:
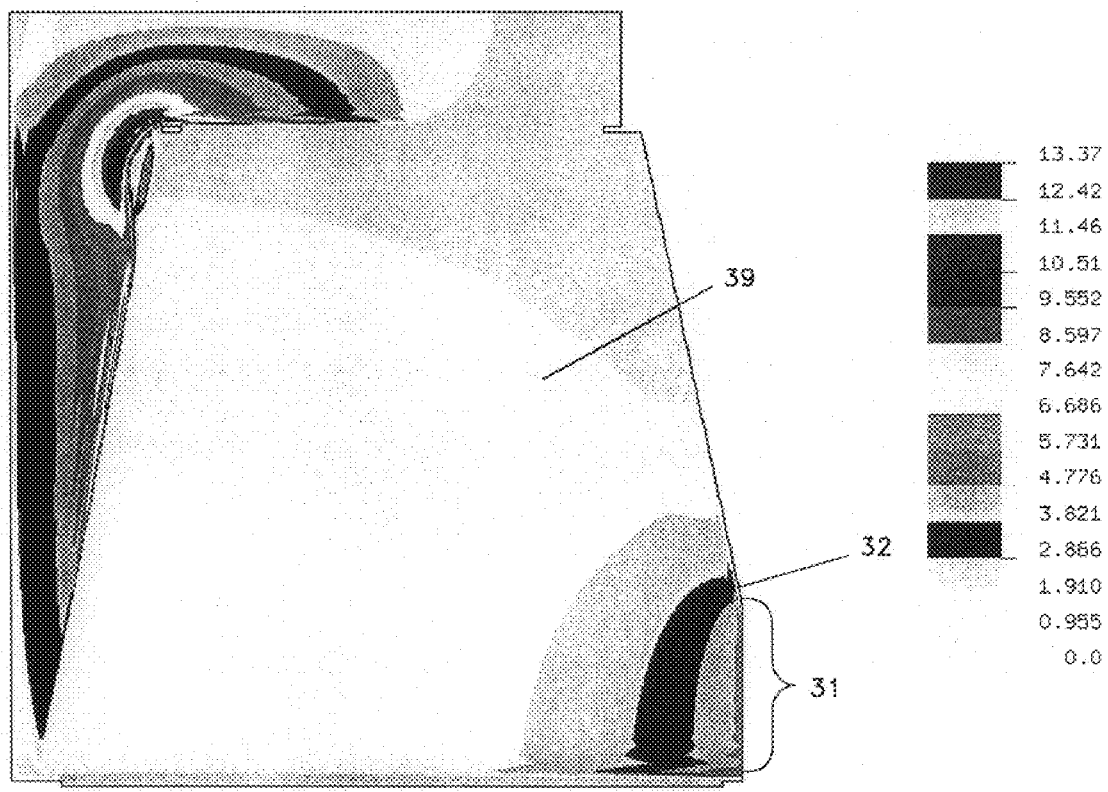
FIG. 11 shows a flow diagram (vector diagram) of an embodiment of the invention having a front panel access with an open area of about eight inches to about thirteen inches providing a horizontal filtered gas flow through the filtered gas flow space.
Figure 12:
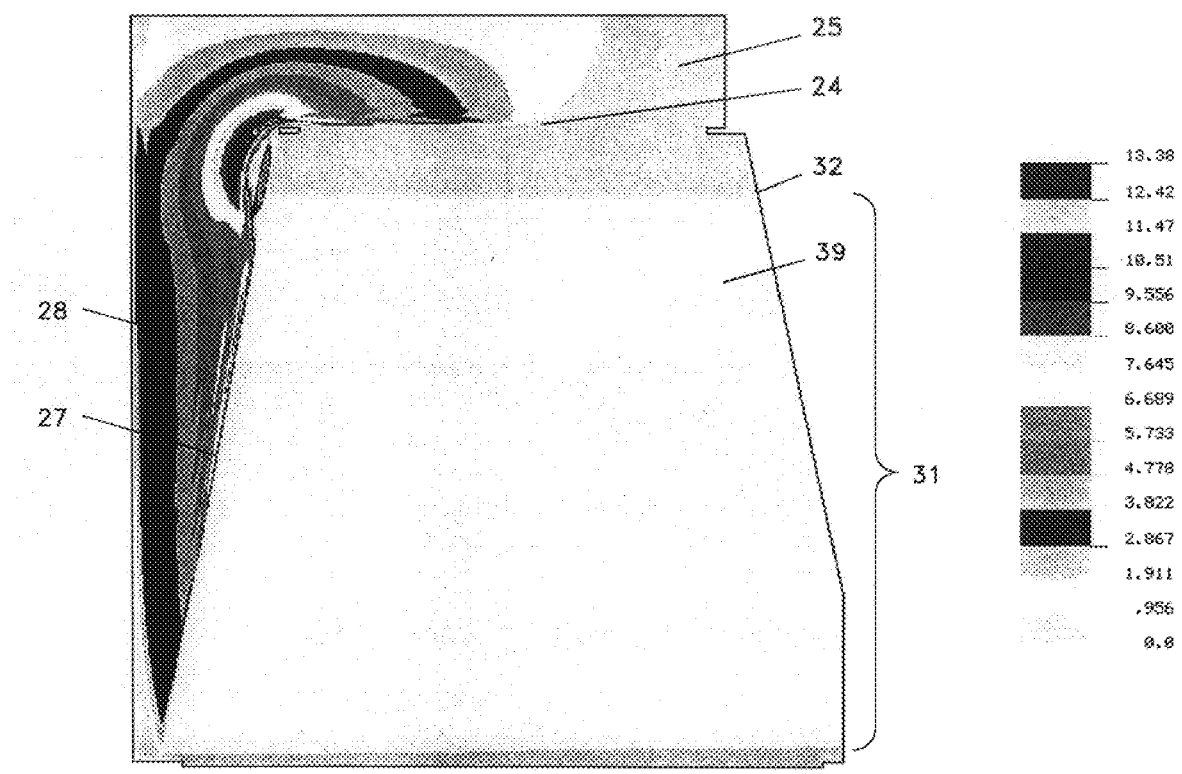
FIG. 12 shows a flow diagram (vector diagram) of an embodiment of the invention having a front panel access with an open area of about 30 inches providing a horizontal filtered gas flow through the filtered gas flow space.

As shown by FIG. 9, filtered gas flow can be substantially verticle within the filtered gas flow space. Or as shown by FIGS. 10 and 11, filtered gas flow can be substantially horizontal. FIG. 10 shows that the front access opening can be about 30 inches without substantially changing the vertical gas flow pattern within the filtered gas flow space.

Figure 13:
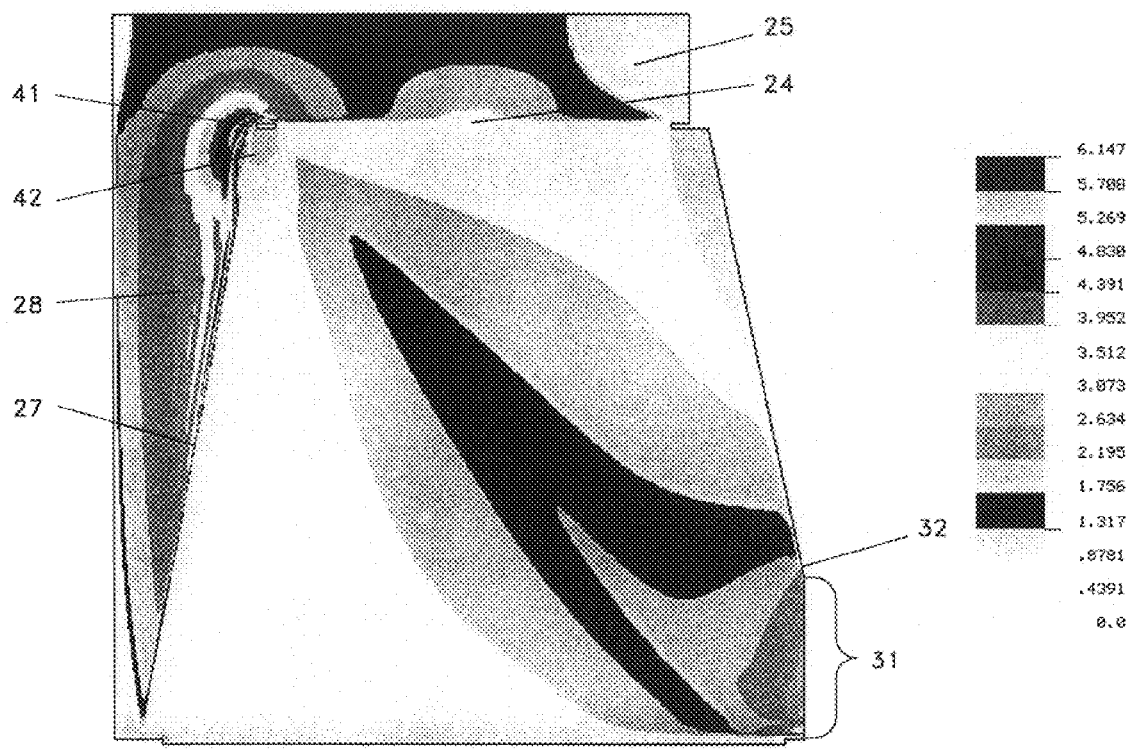
FIG. 13 shows a flow diagram (vector diagram) of an embodiment of the invention having a front panel access with an open area of about eight inches to about thirteen inches providing a horizontal filtered gas flow and a vertical gas flow through the filtered gas flow space.
Figure 14:
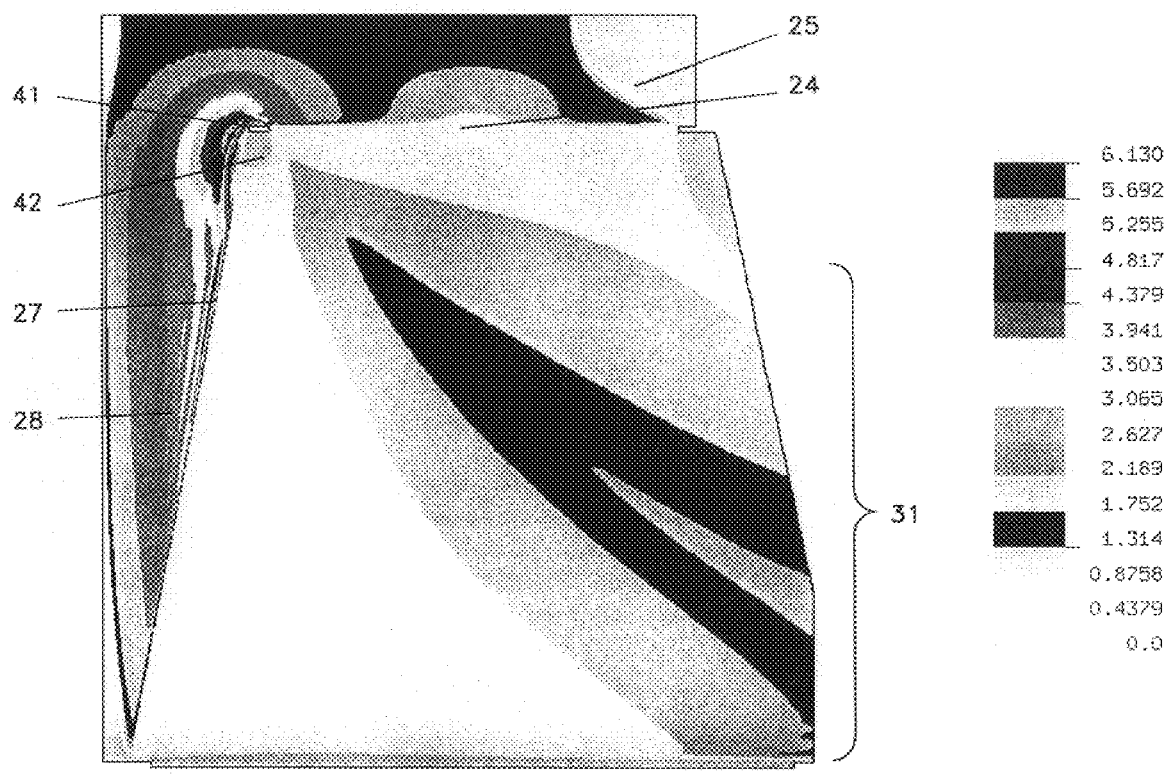
FIG. 14 shows a flow diagram (vector diagram) of an embodiment of the invention having a front panel access with an open area of about 30 inches providing a horizontal filtered gas flow and a vertical gas flow through the filtered gas flow space.
Figure 15:
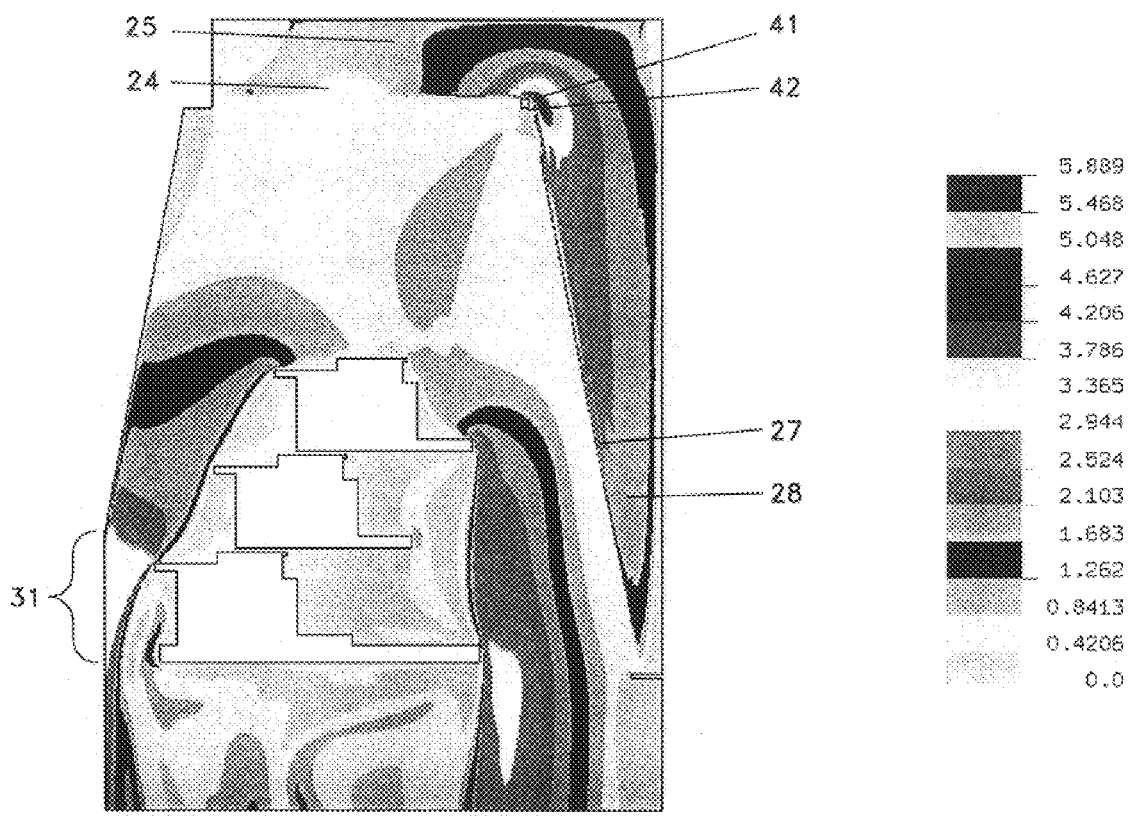
FIG. 15 shows a flow diagram (vector diagram) of an embodiment of the invention having a front panel access with an open area of between about eight inches to about thirteen inches and where material handling equipment is within the filtered gas flow space.
Figure 16:
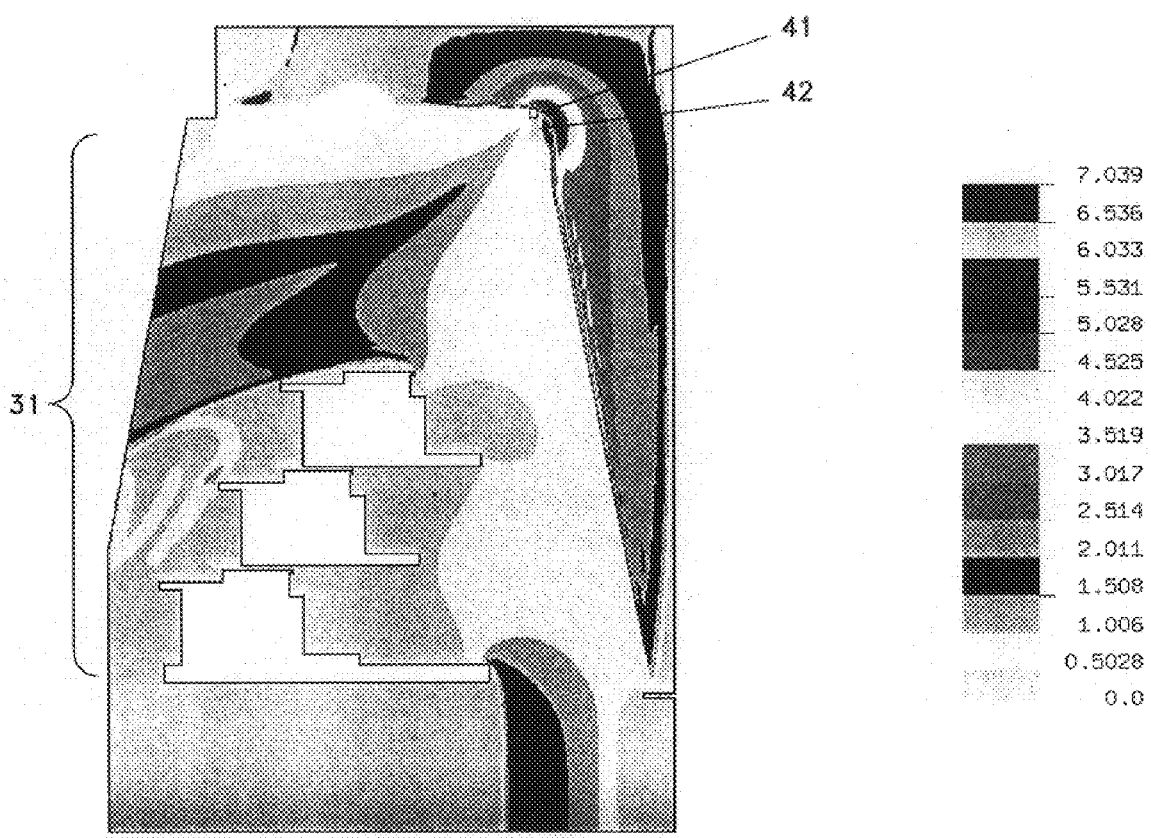
FIG. 16 shows a flow diagram (vector diagram) of an embodiment of the invention having a front panel access with an open area of about 30 inches and where material handling equipment is within the filtered gas flow space.

As shown by FIGS. 13 and 14, where an embodiment of the invention includes the above-mentioned elements a filtered gas flow can be established having a velocity gradient within the vertical flow path (22) and the horizontal flow path (21) that can have substantial symmetry about a plane that projects from the vertex (41) where the first perforated plenum panel (24) and the second perforated plenum panel (27) join, and bisects the open area (31) of the front panel access element (32) having a width substantially that of the panel assembly (or filtered gas flow space) (20) and a height of between about eight inches to about 13 inches, or about 30 inches, positioned substantially at the bottom of the front panel (3) as shown in FIGS. 13 and 14. When operated in this configuration the filtered gas flow space (20) has an area of lowest velocity (42) most distal from the open area (31) of the front access element (32) as shown in FIGS. 13 and 14. This area of lowest velocity (42) most distal from the open area of the front panel access element can have a minimum volume. By adjusting the filtered gas flow to the gas flow space such minimum volume can have a cross sectional area as small as a few inches (between two to five in some embodiments of the invention).

Figure 7:
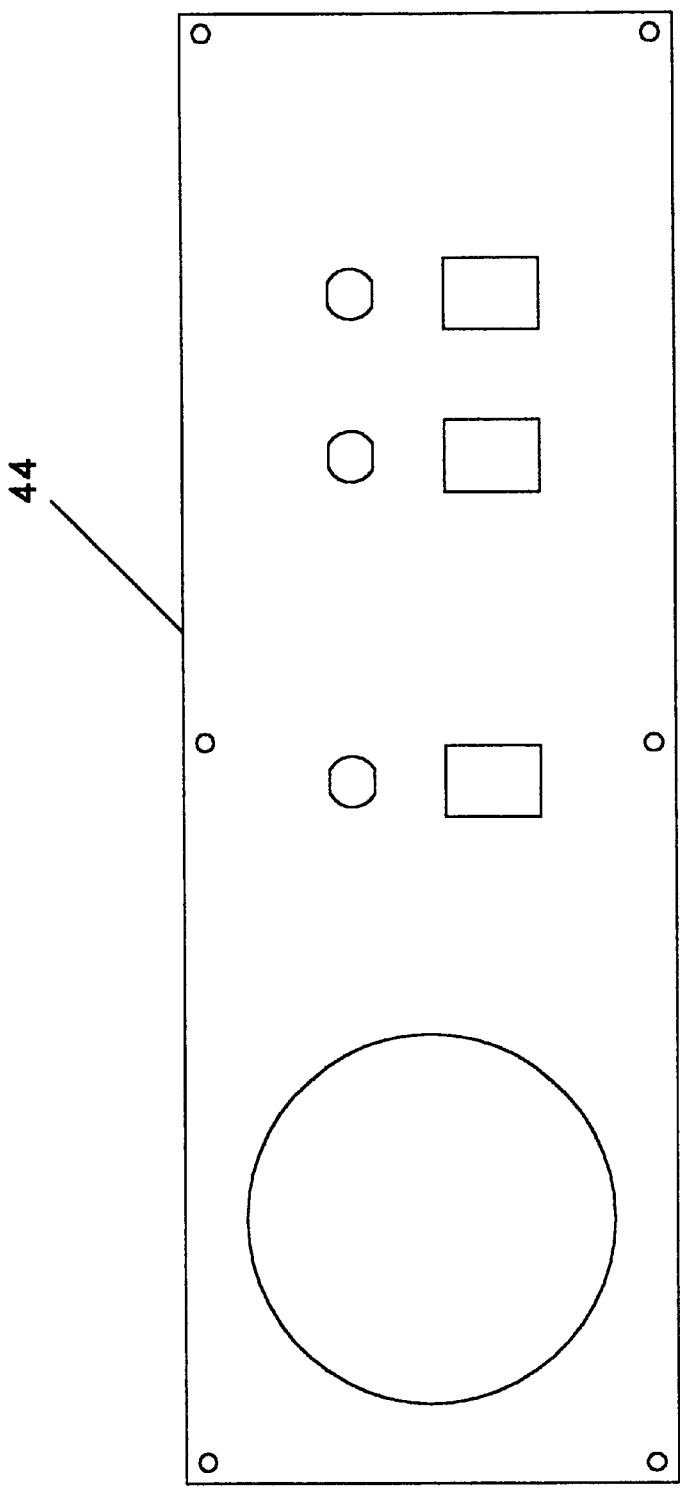
FIG. 7 shows an embodiment of a instrument monitoring panel.

As shown in FIG. 8, the invention can also include a utilities attachment panel (43) for the attachment of the appropriate utilities (i.e. power, vacuum, compressed gas, process gases, or the like). FIG. 7 also shows the instrument panel (44) electrical wiring configuration for an embodiment of the invention.

As can be easily understood, the basic concepts of the present invention may be embodied in a variety of ways. It involves both techniques for creating and using pressure differential distribution enclosures including adjustable clean air flow enclosures. In this application, the techniques for creating and using pressure differential distribution enclosures are disclosed as part of the results shown to be achieved by the various devices described and as steps which are inherent to utilization. They are simply the natural result of utilizing the devices as intended and described. In addition, while some devices are disclosed, it would be understood that these not only accomplish certain methods but also can be varied in a number of ways. Importantly, as to all of the foregoing, all of these facets should be understood to be encompassed by this disclosure.

The discussion included in this application for patent is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims which will be included in a full patent application.

It should be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure.

In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of an "adjustable clean gas material handling environment" should be understood to encompass disclosure of the act of "adjusting a clean gas material handling environment"—whether explicitly discussed or not—and, conversely, were there only disclosure of the act of "adjusting a clean gas handling environment", such a disclosure should be understood to encompass disclosure of an "adjustable clean gas material handling environment" or even a means for "adjusting a clean gas handling environment". Such changes and alternative terms are to be understood to be explicitly included in the description. In addition, it should be understood that the various combinations and permutations of each of the elements disclosed may be also utilized in making or amending any claims.

Any acts of law, statutes, regulations, or rules mentioned in this application for patent; or patents, publications, or other references mentioned in this application for patent; or other information statement filed with the application are hereby incorporated by reference; however, to the extent that such information or statements incorporated by reference might be considered inconsistent with the patenting of this/these invention(s) such statements are expressly not to be considered as made by the applicant(s).

We claim:

1. A pressure differential distribution enclosure, comprising:
   a. a panel assembly of substantially polygonal geometry having at least a top panel, a front panel, a rear panel, and a pair of side panels which define an interior volume from an exterior volume;
   b. a filtered -as delivery assembly comprising:
      i. a gas flow generator, wherein said gas flow generator establishes a gas flow from said exterior volume to said interior volume;
      ii. a gas filter responsive to said gas flow from said exterior volume to said interior volume;
   c. a first plenum fluidicly coupled to said filtered gas delivery assembly, wherein said first plenum has a first perforated plenum panel adjoined to a first plenum space and a vertical flow path within said interior volume;
   d. a second plenum fluidicly coupled to said first plenum, wherein said second plenum has a second perforated plenum panel adjoined to a second plenum space and a horizontal flow path within said interior volume;

e. a closure between said first plenum space and said second plenum space; and f. at least one access element coupled to said panel assembly.

2. A pressure differential distribution enclosure as described in claim 1, wherein said first plenum space further comprises a static regain configuration to deliver filtered gas to substantially the entire surface area of said first perforated plenum panel adjoined to said first plenum space.

3. A pressure differential distribution enclosure as described in claim 2, wherein said filtered gas has an essentially uniform velocity over substantially the entire perforated surface area of said first perforated plenum panel adjoined to said vertical flow path.

4. A pressure differential distribution enclosure as described in claim 3, wherein said first plenum space has a height of between about six inches to about 24 inches between said filtered gas delivery assembly and said first perforated plenum panel.

5. A pressure differential distribution enclosure as described in claim 4, wherein said first perforated plenum panel has between about ten percent to about thirteen percent surface area perforated.

6. A pressure differential distribution enclosure as described in claim 5, wherein said second perforated plenum panel has a perforated surface area adjoined to substantially the entire height and substantially the entire width of said horizontal flow path.

7. A pressure differential distribution enclosure as described in claim 6, wherein said second perforated plenum panel converts vertical filtered gas flow within said second plenum space to substantially horizontal filtered gas flow at said surface area adjoined to substantially the entire height and substantially the entire width of said horizontal flow path.

8. A pressure differential distribution enclosure as described in claim 7, wherein said second plenum space further comprises a static regain configuration to deliver filtered gas to substantially the entire surface area of said second perforated plenum panel adjoined to said second plenum space.

9. A pressure differential distribution enclosure as described in claim 8, wherein said static regain configuration delivers said substantially horizontal filtered gas flow at said surface area which adjoins substantially the entire height and substantially the entire width of said horizontal flow path at an essentially uniform velocity.

10. A pressure differential distribution enclosure as described in claim 9, wherein said static regain configuration has a cross section which defines a right triangle having a base proximal to said gas flow generator, and wherein a vertex opposite said base has an angle between about ten degrees to about thirteen degrees, and wherein said vertex opposite said base is truncated, and wherein the hypotenuse adjoins said second perforated plenum panel.

11. A pressure differential distribution enclosure as described in claim 10, wherein said second perforated plenum panel has between about ten percent to about thirteen percent surface area perforated.

12. A pressure differential distribution enclosure as described in claim 11, further comprising a bottom panel responsive to said horizontal flow path and said vertical flow path within said interior volume, wherein said bottom panel has between about zero percent to about sixty percent perforated surface area.

13. A pressure differential distribution enclosure as described in claim 12, wherein said bottom panel has between about zero percent to about twenty percent perforated surface area.

14. A pressure differential distribution enclosure as described in claim 13, wherein said at least one access element coupled to said panel assembly comprises a front panel access element having an open area with a width of said horizontal flow path and a height between about eight inches to about thirteen inches positioned at substantially the bottom of said front panel.

15. A pressure differential distribution enclosure as described in claim 14, wherein said filtered gas flow at said open area of said front panel access element has a velocity of between about 75 feet per minute to about 130 feet per minute.

16. A pressure differential distribution enclosure as described in claim 11, wherein said front panel access element having an open area with a width of said horizontal flow path has a height of about thirty inches.

17. A pressure differential distribution enclosure as described in claim 16, wherein said filtered gas flow at said open area of said front panel access element has a velocity of between about 50 feet per minute to about 70 feet per minute.

18. A pressure differential distribution enclosure as described in claim 17, further comprising an adjustable gas flow interference assembly responsive to said first perforated plenum panel which comprises:

i. a first filtered gas flow interference panel having a perforated surface;

ii. a second filtered gas flow interference panel having a perforated surface, wherein said first gas flow interference panel and said second gas flow interference panel are slidably responsive to vary the amount of said filtered gas flow to said vertical flow path within said interior volume.

19. A pressure differential distribution enclosure as described in claim 18, wherein said adjustable gas flow interference assembly varies said filtered gas flow to said vertical flow path within said interior volume between substantially zero feet per minute to about thirty feet per minute.

20. A pressure differential distribution enclosure as described in claim 19, wherein said adjustable closure regulates said filtered gas flow to said horizontal gas flow path to a velocity of between substantially zero to about thirty feet per minute.

21. A pressure differential distribution enclosure as described in claim 20, wherein said adjustable gas flow interference assembly and said adjustable closure are adjusted to establish a vertical filtered gas flow within said interior volume and substantially eliminate a horizonal filtered gas flow within said interior volume.

22. A pressure differential distribution enclosure as described in claim 21, wherein said adjustable gas flow interference assembly and said adjustable closure are adjusted to establish said horizontal filtered gas flow within said interior volume and substantially eliminate said vertical filtered gas flow within said interior volume.

23. A pressure differential distribution enclosure as described in claim 22, wherein said adjustable gas flow interference assembly and said adjustable closure are adjusted to establish said horizontal filtered gas flow within said interior volume and establish said vertical filtered gas flow within said interior volume.

24. A pressure differential distribution enclosure as described in claim 23, wherein said filtered gas flow has a velocity gradient within said vertical flow path and said horizontal flow path with substantial symmetry about a plane, wherein said plane projects from a vertex where said first perforated plenum panel and said second perforated plenum panel join and bisects said open area of said front panel access element having a width of said horizontal flow path and a height between about eight inches to about thirteen inches positioned at substantially the bottom of said front panel.

25. A pressure differential distribution enclosure as described in claim 24, wherein said filtered gas flow has an area of lowest velocity within said vertical flow path and said horizontal flow path most distal from open area of said front panel access element having is a width of said horizontal flow path and a height between about eight inches to about thirteen inches positioned at substantially the bottom of said front panel.

26. A pressure differential distribution enclosure as described in claim 25, wherein said area of lowest velocity within said vertical flow path and said horizontal flow path most distal from open area of said front panel access element has a minimal volume.

27. A pressure differential distribution enclosure as described in claim 26, wherein said at least one access element coupled to said panel assembly comprises a rear panel access element.

28. A pressure differential distribution enclosure as described in claim 27, wherein said at least one access element coupled to said panel assembly comprises a side panel access element.

29. A pressure differential distribution enclosure as described in claim 28, wherein said filtered gas delivery assembly comprises at least one MAC-10 ENVIRCO having a filtered gas flow rate of about 90 feet per minute.

30. A pressure differential distribution enclosure as described in claim 29, wherein said filter responsive to said gas flow from said exterior volume to said interior volume comprises a HEPA filter.

31. A pressure differential distribution enclosure as described in claim 30, wherein said filter responsive to said gas flow from said exterior volume to said interior volume comprises an ULPA filter.

32. A method of distributing a pressure differential within an enclosure comprising the steps of:
  a. providing a panel assembly of substantially polygonal geometry having at least a top panel, a front panel, a rear panel, and a pair of side panels which define and interior volume from an exterior volume;
  b. coupling a filtered gas delivery assembly;
  c. configuring a first plenum having a first perforated plenum panel adjoining a first plenum space and a vertical flow path within said interior volume;
  d. configuring a second plenum fluidicly coupled to said first plenum, wherein said second plenum has a second perforated plenum panel adjoining a second plenum space and a horizontal flow path within said interior volume;
  e. providing a closure between said first plenum space and said second plenum space; and
  f. joining at least one access element to said panel assembly.

33. A method of distributing a pressure differential within an enclosure comprising the steps of:
  a. generating a gas flow from an exterior volume to an interior volume defined by a panel assembly of substantially polygonal geometry having at least a top panel, a rear panel, a front panel and a pair of side panels;
  c. filtering said gas flow;
  d. distributing a filtered gas flow to a first plenum having a first perforated plenum panel, wherein said first perforated plenum panel adjoins a first plenum space and a vertical flow path within said interior volume;
  e. delivering said filtered gas flow from said first plenum space to said vertical flow path within said interior volume;
  f. distributing said filtered gas flow to a second plenum having a second perforated plenum panel, wherein said second plenum and said first plenum are fluidicly coupled, and wherein said second perforated plenum panel adjoins a second plenum space and a horizontal flow path within said interior volume;
  g. delivering said filtered gas flow from said second plenum space to a horizontal flow path within said interior volume; and
  h. establishing a filtered gas flow to at least one access element having an open area fluidicly coupled to said exterior volume.

34. A method of distributing a pressure differential within an enclosure as described in claim 33, further comprising the step of distributing said filtered gas flow to the entire surface area of said first perforated plenum panel adjoining said first plenum space.

35. A method of distributing a pressure differential within an enclosure as described in claim 34, further comprising the step of delivering said filtered gas flow at an essentially uniform velocity from the entire perforated surface area of said first perforated plenum panel adjoining said vertical flow path.

36. A method of distributing a pressure differential within an enclosure as described in claim 35, further comprising the step of distributing said filtered gas flow to the entire surface area of said second perforated plenum panel adjoining said second plenum space.

37. A method of distributing a pressure differential within an enclosure as described in claim 36, further comprising the step of converting vertical filtered gas flow within said second plenum space to substantially horizontal filtered gas flow at the perforated surface area of said second plenum panel adjoining said horizontal flow path.

38. A method of distributing a pressure differential within an enclosure as described in claim 37, further comprising the step of delivering said filtered gas flow at essentially uniform velocity from the entire perforated surface area of said second perforated plenum panel adjoining said horizontal flow path.

39. A method of distributing a pressure differential within an enclosure as described in claim 38, further comprising the step of adjoining the entire height and width of said horizontal flow path with said surface area of said second perforated plenum panel.

40. A method of distributing a pressure differential within an enclosure as described in claim 39, wherein said step of establishing a filtered gas flow to at least one access element having an open area fluidicly coupled to said exterior volume comprises establishing a velocity of between 75 feet per minute to about 130 feet per minute at said open area fluidicly coupled to said exterior volume, wherein said open area comprises an area substantially the width of said horizontal flow path and has a height of between about 8 to about 12 inches positioned at substantially the bottom of said front panel.

41. A method of distributing a pressure differential within an enclosure as described in claim 40, wherein said step of establishing a filtered gas flow to at least one access element having an open area fluidicly coupled to said exterior volume comprises establishing a velocity of between about 50 feet per minute to about 70 feet per minute at said open area fluidicly coupled to said exterior volume, wherein said open area comprises an area substantially the width of said horizontal flow path and has a height of between about 30 inches.

42. A method of distributing a pressure differential within an enclosure as described in claim 41, further comprising the step of adjusting the amount of said filtered gas flow to said second plenum.

43. A method of distributing a pressure differential within an enclosure as described in claim 42, wherein said step of adjusting the amount of said filtered gas flow to said second plenum comprises establishing a substantially vertical filtered gas flow within said vertical flow path and substantially eliminating a horizontal filtered gas flow within said horizontal flow path.

44. A method of distributing a pressure differential within an enclosure as described in claim 43, further comprising the step of adjusting amount of said filtered gas flow from said first plenum to said vertical flow path.

45. A method of distributing a pressure differential within an enclosure as described in claim 44, wherein said step of adjusting amount of said filtered gas flow from said first plenum to said vertical flow path comprises establishing a substantially horizontal filtered gas flow within said horizontal flow path and substantially eliminating a vertical filtered gas flow within said vertical flow path.

46. A method of distributing a pressure differential within an enclosure as described in claim 45, wherein said step of adjusting amount of said filtered gas flow from said first plenum to said vertical flow path comprises:
   i. sliding a first perforated panel over a second perforated panel, wherein said first perforated panel and said second perforated panel are responsive to said gas flow from said plenum space to said vertical flow path;
   ii. juxtaposing a portion of the perforated surface area of said first perforated panel with the perforated surface area of said second perforated panel;
   iii. adjusting the amount of juxtaposed perforated surface area; and
   iv. varying the rate of said filtered gas flow from said plenum space to said vertical flow path.

47. A method of distributing a pressure differential within an enclosure as described in claim 46, further comprising the step of establishing a velocity gradient within said vertical flow path and said horizontal flow path which has substantial uniform symmetry about a plane which projects from the vertex at which said first perforated plenum panel and said second plenum panel join and which bisects the area of said open area of said access element having a width of said horizontal flow path and a height between about eight inches to about thirteen inches positioned at substantially the bottom of said front panel.

48. A method of distributing a pressure differential within an enclosure as described in claim 47, further comprising the step of establishing an area of filtered gas flow within said vertical flow path and said horizontal flow path having the lowest velocity at the vertex where said first perforated plenum panel and said second perforated plenum panel join.

49. A method of distributing a pressure differential within an enclosure as described in claim 48, wherein said step of filtering said gas flow further comprises removing substantially all particles from said gas flow having a size greater than about 0.3 microns.

50. A method of distributing a pressure differential within an enclosure as described in claim 49, wherein said step of filtering said gas flow further comprises removing particles from said gas flow having a size greater than about 0.12 microns.

51. A method of distributing a pressure differential within an enclosure as described in claim 50, further comprising the step of maintaining a gas flow within said horizontal flow path essentially free of all particles having a size greater than about 0.3 microns during a period of time an object traverses the plane between said interior volume and said exterior volume through said open area of said access element.

* * * * *